United States Patent   (10) Patent No.: US 12,391,274 B2
Vazquez-Chanlatte et al.   (45) Date of Patent: Aug. 19, 2025

(54) LEARNING CONSTRAINTS OVER BELIEFS IN AUTONOMOUS VEHICLE OPERATIONS

(71) Applicant: Nissan North America, Inc., Franklin, TN (US)

(72) Inventors: Marcell Vazquez-Chanlatte, Palo Alto, CA (US); Stefan Witwicki, San Carlos, CA (US)

(73) Assignee: Nissan North America, Inc., Franklin, TN (US)

( * ) Notice: Subject to any disclaimer, the term of this patent is extended or adjusted under 35 U.S.C. 154(b) by 273 days.

(21) Appl. No.: 18/175,747

(22) Filed: Feb. 28, 2023

(65) Prior Publication Data

US 2024/0286634 A1    Aug. 29, 2024

(51) Int. Cl.
*B60W 60/00*    (2020.01)
*B60W 50/00*    (2006.01)
*G05B 13/02*    (2006.01)

(52) U.S. Cl.
CPC .......... *B60W 60/001* (2020.02); *B60W 50/00* (2013.01); *G05B 13/0265* (2013.01)

(58) Field of Classification Search
CPC .... B60W 60/001; B60W 50/00; B60W 30/12; B60W 30/16; G05B 13/0265; B60K 28/00; B60K 28/165; G05D 1/021; G05D 1/0214; G05D 1/0221; G05D 1/0223; G05D 1/0061; G05D 1/0088
USPC ..................................... 701/27, 481, 59, 32.7
See application file for complete search history.

(56) References Cited

U.S. PATENT DOCUMENTS

| | | | |
|---|---|---|---|
| 10,649,453 B1 * | 5/2020 | Svegliato | B60W 50/029 |
| 11,027,751 B2 | 6/2021 | Wray et al. | |
| 11,332,165 B2 * | 5/2022 | Akash | B60W 50/14 |
| 11,635,758 B2 * | 4/2023 | Wray | B60W 30/14 |
| | | | 701/27 |
| 2006/0200333 A1 * | 9/2006 | Dalal | G06F 30/20 |
| | | | 712/43 |
| 2017/0297576 A1 * | 10/2017 | Halder | G01C 21/3415 |
| 2019/0329763 A1 * | 10/2019 | Sierra Gonzalez | |
| | | | B60W 30/0956 |
| 2020/0005645 A1 * | 1/2020 | Wray | G08G 1/166 |
| 2020/0073382 A1 * | 3/2020 | Noda | G06V 20/58 |
| 2020/0269875 A1 * | 8/2020 | Wray | B60W 60/0011 |
| 2020/0331491 A1 * | 10/2020 | Wray | B60W 30/18154 |
| 2021/0009154 A1 * | 1/2021 | Wray | G08G 1/163 |
| 2021/0078602 A1 * | 3/2021 | Wray | H04L 63/1425 |
| 2021/0157315 A1 * | 5/2021 | Wray | G05D 1/0212 |

(Continued)

OTHER PUBLICATIONS

Kyle Hollins Wray et al., POMDPs for Safe Visibility Reasoning in Autonomous Vehicles, Mar. 2021, IEEE, pp. 191-195.*

(Continued)

*Primary Examiner* — Manglesh M Patel
(74) *Attorney, Agent, or Firm* — Young Basile Hanlon & MacFarlane, P.C.

(57) ABSTRACT

Autonomous vehicle operations use learned constraints over beliefs to traverse a vehicle transportation network. Sensor data and user demonstration data are used to determine a belief path using a partially observable Markov decision process (POMDP) model. The belief path can be updated based on the learned constraints. Candidate actions are determined based on the POMDP model. The candidate actions are constrained by the updated belief path. An action is selected, and the vehicle traverses the vehicle network using the selected action.

20 Claims, 9 Drawing Sheets

(56) References Cited

U.S. PATENT DOCUMENTS

| | | | |
|---|---|---|---|
| 2021/0188297 A1* | 6/2021 | Wray | B60W 50/0098 |
| 2021/0200208 A1* | 7/2021 | Wray | B60W 30/0953 |
| 2021/0268653 A1* | 9/2021 | Tian | B25J 9/1664 |
| 2022/0097736 A1* | 3/2022 | Lin | B60W 60/0015 |
| 2022/0164636 A1* | 5/2022 | Fadaie | G06N 3/047 |
| 2022/0324484 A1* | 10/2022 | Hruschka | B60W 30/0956 |
| 2022/0371612 A1* | 11/2022 | Wray | B60W 50/14 |
| 2022/0382279 A1* | 12/2022 | Wray | G05D 1/0088 |
| 2023/0227031 A1* | 7/2023 | Kobashi | B60W 60/00272 |
| | | | 701/26 |
| 2024/0140472 A1* | 5/2024 | Bill Clark | B60W 40/02 |
| 2024/0149920 A1* | 5/2024 | Zheng | B60W 40/04 |
| 2024/0166242 A1* | 5/2024 | Dai | B60W 30/18159 |
| 2025/0083702 A1* | 3/2025 | Drusinsky | G06N 7/01 |

OTHER PUBLICATIONS

Marcell Vazquez-Chanlatte; Specifications from Demonstrations: Learning, Teaching, and Control; EECS Department University of California, Berkeley Technical Report No. UCB/EECS-2022-107, May 13, 2022; http://www2.eecs.berkeley.edu/Pubs/TechRpts/2022/EECS-2022-107.pdf.

Jha, Susmit & Seshia, Sanjit. (2014). Are there good mistakes? A theoretical analysis of CEGIS. Electronic Proceedings in Theoretical Computer Science. 157. 10.4204/EPTCS.157.10. ; https:/arxiv.org/pdf/1407.5397.pdf.

Software Modeling and Verification Group; RWTH Aachen University, Aachen, Germany; STORM; https://www.stormchecker.org/; accessed Feb. 28, 2023.

* cited by examiner

LEARNING CONSTRAINTS OVER BELIEFS IN AUTONOMOUS VEHICLE OPERATIONS

TECHNICAL FIELD

This disclosure relates to vehicle operational management and driving, including autonomous vehicle operational management and autonomous driving.

BACKGROUND

A vehicle, such as an autonomous vehicle, can traverse a portion of a vehicle transportation network. Traversing the vehicle transportation network includes generating or capturing, such as by a sensor of the vehicle, data representing an operational state of the vehicle. This data may be used for localization of the vehicle within the vehicle transportation network.

SUMMARY

Disclosed herein are aspects, features, elements, implementations, and embodiments for learning constraints over beliefs in an autonomous vehicle. An aspect may include a method for use in a vehicle may include obtaining sensor data. The method may include obtaining user demonstration data. The user demonstration data may be data associated with a sequence of actions and probability distributions of a current state of the vehicle. The method may include determining a belief path based on the sensor data and the user demonstration data using a partially observable Markov decision process (POMDP) model. The method may include determining learned constraints. The method may include updating the belief path based on the learned constraints. The method may include determining candidate actions based on the POMDP model. The candidate actions may be constrained by the updated belief path. The method may include selecting an action of the candidate actions that is above a probability threshold. The method may include traversing a vehicle network using the selected action.

An aspect may include a vehicle that includes a sensor and a processor. The sensor may be configured to obtain sensor data. The processor may be configured to obtain user demonstration data. The user demonstration data may be data that associated with a sequence of actions and probability distributions of a current state of the vehicle. The current state of the vehicle may be determined based on the sensor data. The processor may be configured to determine a belief path based on the sensor data and the user demonstration data using a POMDP model. The processor may be configured to determine learned constraints. The processor may be configured to update the belief path based on the learned constraints. The processor may be configured to determine candidate actions based on the POMDP model. The candidate actions may be constrained by the updated belief path. The processor may be configured to select an action of the candidate actions that is above a probability threshold. The processor may be configured to cause the vehicle to traverse a vehicle network using the selected action.

An aspect may include a non-transitory computer-readable medium that includes instructions, that when executed by a processor, cause the processor to perform operations. The operations may include obtaining sensor data. The operations may include obtaining user demonstration data. The user demonstration stat may be associated with a sequence of actions and probability distributions of a current state of a vehicle. The operations may include determining a belief path based on the sensor data and the user demonstration data using a POMDP model. The operations may include determining learned constraints. The operations may include updating the belief path based on the learned constraints. The operations may include determining candidate actions based on the POMDP model. The candidate actions may be constrained by the updated belief path. The operations may include selecting an action of the candidate actions that is above a probability threshold. The operations may include causing the vehicle to travers a vehicle network using the selected action.

Variations in these and other aspects, features, elements, implementations, and embodiments of the methods, apparatus, procedures, and algorithms disclosed herein are described in further detail hereafter.

BRIEF DESCRIPTION OF THE DRAWINGS

The various aspects of the methods and apparatuses disclosed herein will become more apparent by referring to the examples provided in the following description and drawings in which like reference numbers refer to like elements unless otherwise noted.

DETAILED DESCRIPTION

Figure 1:
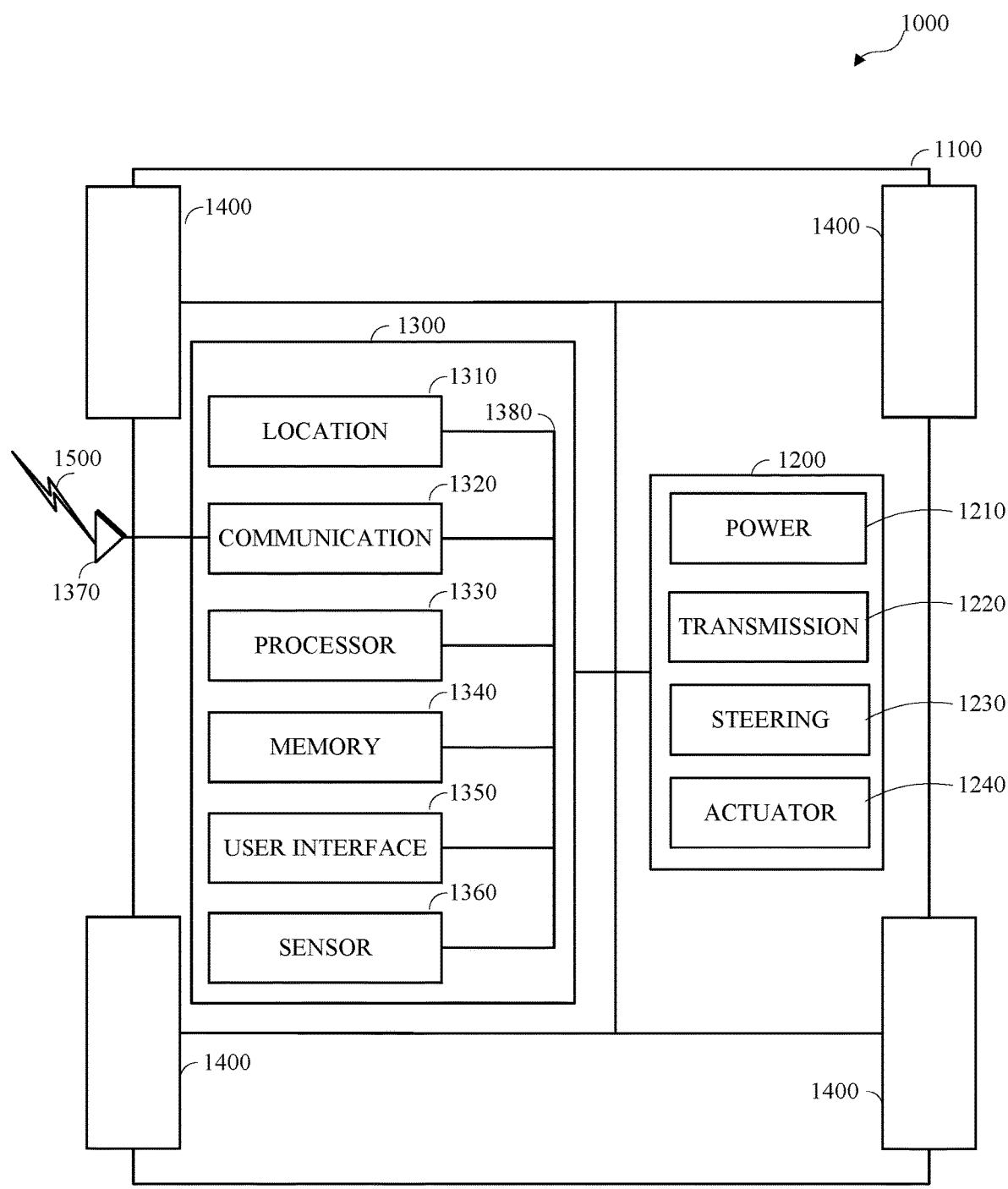
FIG. 1 is a diagram of an example of a vehicle in which the aspects, features, and elements disclosed herein may be implemented.

A vehicle, such as an autonomous vehicle, or a semi-autonomous vehicle, may traverse a portion of a vehicle transportation network. The vehicle may include one or more sensors and traversing the vehicle transportation network may include the sensors generating or capturing sensor data for use in traversing the vehicle transportation network. Sensor data may include vehicle operational information, such as global positioning system (GPS) coordinates, whether the vehicle is moving or in a fixed position, a vehicle heading, etc. Sensor data may also include information corresponding to the operational environment of the vehicle, such as information corresponding to one or more external objects, such as pedestrians, remote vehicles, other objects within the vehicle operational environment, vehicle transportation network geometry or topology, or a combination thereof. This information may be referred to herein as operational environment information.

Typical autonomous vehicle decision making systems are often constrained to not violate laws or user preferences. For example, an autonomous vehicle should not enter an intersection unless a certainty value indicates that it is at least 99% certain that no other vehicle will conflict with its path. In this example, the 99% certainty may not reflect the true risk tolerance of the user. Embodiments of this disclosure address the problem of learning such belief space constraints from user driving demonstrations. The form of constraints learned enable composition with a-priori known constraints, e.g., due to legislation or insurance contracts.

Embodiments of this disclosure include an autonomous vehicle that includes an autonomous vehicle operational management system, which may include one or more operational environment monitors that may process operational environment information, such as the sensor data, for the autonomous vehicle. The operational management system may include a learning monitor that may determine probability of a vehicle control action based on a stored observation of the operational environment.

An advantage of the autonomous vehicle operational management system may be that working with believe constraints is made more ergonomic and better reflects the desires of the designer. Another advantage may be that the resulting constraints may be used to diagnose accidents and incidents, should they occur. For example, if an accident occurs despite the belief constraint stating that the vehicle should be very confident that no vehicle was in the intersection, then the analysis can focus on prediction and perception systems instead of the decision-making logic. Another advantage may be that the resulting artifacts and therefore offer the machine checkability using tools from a formal verification community, such as by using model checkers. Another advantage may be that well defined composition, such as conjunction and disjunction, are provided to enable the combination of learned constraints with a-priori enforced constraints, e.g., due to legislation or user preferences. Another advantage may be that existing user preferences can be used as priors in a constraint sampler to quickly locate constraints that are compatible with the user's preferences.

The autonomous vehicle operational management system may include an autonomous vehicle operational management controller, or executor, which may detect one or more operational scenarios, such as pedestrian scenarios, intersection scenarios, lane change scenarios, or any other vehicle operational scenario or combination of vehicle operational scenarios, corresponding to the external objects.

The autonomous vehicle operational management system may include one or more scenario-specific operational control evaluation modules. Each scenario-specific operational control evaluation module may be a model, such as a Partially Observable Markov Decision Process (POMDP) model, of a respective operational scenario. The autonomous vehicle operational management controller may instantiate respective instances of the scenario-specific operational control evaluation modules in response to detecting the corresponding operational scenarios.

The autonomous vehicle operational management controller may receive candidate vehicle control actions from respective instantiated scenario-specific operational control evaluation module instances, may identify a vehicle control action from the candidate vehicle control actions, and may control the autonomous vehicle to traverse a portion of the vehicle transportation network according to the identified vehicle control action.

Autonomous vehicles are programmed to perform scenario-specific actions. In the real world, however, it is impossible to predict every possible scenario and code corresponding solutions for every possible scenario into the autonomous vehicle system. To do so would take countless hours and teams of engineers to code every scenario and/or problem into the autonomous vehicle system.

The embodiments disclosed herein describe methods and vehicles configured to gain experience in the form of constraining candidate actions based on belief probabilities for an operational scenario as the vehicle traverses a vehicle transportation network. These candidate actions may be incorporated into a model in the form of learning to improve the model over time. These candidate actions may be used to customize solutions for specific intersections, locations of merges, and pedestrian crosswalks, etc.

The embodiments disclosed herein may be used to improve integration with human behavior. For example, driver feedback may be used in the learning examples to improve future performance and to integrate with human behavior beyond an initial model. The learning examples may also use information from other vehicles to improve future performance. Since the model may change based on driver feedback, the model may be tuned to improve the vehicle behavior with a reward for more human-centric driving. The driver feedback may be referred to as user demonstration data. User demonstration data is data associated with a sequence of actions and probability distributions of a current state of the vehicle and may be obtained using one or more sensors of the vehicle.

The embodiments disclosed herein may be used to create customized scenario solutions. For example, specific intersections, crosswalks, lane changes, passing stopped vehicles, etc. may be further customized from a more general learned solution. For example, fringe intersections that have unique colloquial behaviors or structures may require a customized scenario solution.

The embodiments disclosed herein may be used for transfer learning. For example, a learned solution to one operational scenario implies that it may be used in multiple other scenarios that may be similar. For example, the experiences learned in one intersection about another vehicle performing a rolling stop may be used to improve the model or expected value. This learned experience may be used at a different intersection to improve the vehicle reaction to a rolling stop of another vehicle.

Although described herein with reference to an autonomous vehicle, the methods and apparatus described herein may be implemented in any vehicle capable of autonomous or semi-autonomous operation. Although described with reference to a vehicle transportation network, the method and apparatus described herein may include the autonomous vehicle operating in any area navigable by the vehicle.

FIG. 1 is a diagram of an example of a vehicle in which the aspects, features, and elements disclosed herein may be implemented. In the embodiment shown, a vehicle 1000 includes a chassis 1100, a powertrain 1200, a controller 1300, and wheels 1400. Although the vehicle 1000 is shown as including four wheels 1400 for simplicity, any other propulsion device or devices, such as a propeller or tread, may be used. In FIG. 1, the lines interconnecting elements, such as the powertrain 1200, the controller 1300, and the wheels 1400, indicate that information, such as data or control signals, power, such as electrical power or torque, or both information and power, may be communicated between the respective elements. For example, the controller 1300 may receive power from the powertrain 1200 and may communicate with the powertrain 1200, the wheels 1400, or both, to control the vehicle 1000, which may include accelerating, decelerating, steering, or otherwise controlling the vehicle 1000.

The powertrain 1200 shown by example in FIG. 1 includes a power source 1210, a transmission 1220, a steering unit 1230, and an actuator 1240. Any other element or combination of elements of a powertrain, such as a suspension, a drive shaft, axles, or an exhaust system may also be included. Although shown separately, the wheels 1400 may be included in the powertrain 1200.

The power source 1210 includes an engine, a battery, or a combination thereof. The power source 1210 may be any device or combination of devices operative to provide energy, such as electrical energy, thermal energy, or kinetic energy. In an example, the power source 1210 includes an engine, such as an internal combustion engine, an electric motor, or a combination of an internal combustion engine and an electric motor, and is operative to provide kinetic energy as a motive force to one or more of the wheels 1400. Alternatively or additionally, the power source 1210 includes a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 1220 receives energy, such as kinetic energy, from the power source 1210, and transmits the energy to the wheels 1400 to provide a motive force. The transmission 1220 may be controlled by the controller 1300, the actuator 1240, or both. The steering unit 1230 controls the wheels 1400 to steer the vehicle and may be controlled by the controller 1300, the actuator 1240, or both. The actuator 1240 may receive signals from the controller 1300 and actuate or control the power source 1210, the transmission 1220, the steering unit 1230, or any combination thereof to operate the vehicle 1000.

In the illustrated embodiment, the controller 1300 includes a location unit 1310, an electronic communication unit 1320, a processor 1330, a memory 1340, a user interface 1350, a sensor 1360, and an electronic communication interface 1370. Fewer of these elements may exist as part of the controller 1300. Although shown as a single unit, any one or more elements of the controller 1300 may be integrated into any number of separate physical units. For example, the user interface 1350 and the processor 1330 may be integrated in a first physical unit and the memory 1340 may be integrated in a second physical unit. Although not shown in FIG. 1, the controller 1300 may include a power source, such as a battery. Although shown as separate elements, the location unit 1310, the electronic communication unit 1320, the processor 1330, the memory 1340, the user interface 1350, the sensor 1360, the electronic communication interface 1370, or any combination thereof may be integrated in one or more electronic units, circuits, or chips.

The processor 1330 may include any device or combination of devices capable of manipulating or processing a signal or other information now-existing or hereafter developed, including optical processors, quantum processors, molecular processors, or a combination thereof. For example, the processor 1330 may include one or more special purpose processors, one or more digital signal processors, one or more microprocessors, one or more controllers, one or more microcontrollers, one or more integrated circuits, one or more Application Specific Integrated Circuits, one or more Field Programmable Gate Array, one or more programmable logic arrays, one or more programmable logic controllers, one or more state machines, or any combination thereof. The processor 1330 is operatively coupled with one or more of the location unit 1310, the memory 1340, the electronic communication interface 1370, the electronic communication unit 1320, the user interface 1350, the sensor 1360, and the powertrain 1200. For example, the processor may be operatively coupled with the memory 1340 via a communication bus 1380.

The memory 1340 includes any tangible non-transitory computer-usable or computer-readable medium, capable of, for example, containing, storing, communicating, or transporting machine readable instructions, or any information associated therewith, for use by or in connection with any processor, such as the processor 1330. The memory 1340 may be, for example, one or more solid state drives, one or more memory cards, one or more removable media, one or more read-only memories, one or more random access memories, one or more disks, including a hard disk, a floppy disk, an optical disk, a magnetic or optical card, or any type of non-transitory media suitable for storing electronic information, or any combination thereof. For example, a memory may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

The communication interface 1370 may be a wireless antenna, as shown, a wired communication port, an optical communication port, or any other wired or wireless unit capable of interfacing with a wired or wireless electronic communication medium 1500. Although FIG. 1 shows the communication interface 1370 communicating via a single communication link, a communication interface may be configured to communicate via multiple communication links. Although FIG. 1 shows a single communication interface 1370, a vehicle may include any number of communication interfaces.

The communication unit 1320 is configured to transmit or receive signals via a wired or wireless electronic communication medium 1500, such as via the communication interface 1370. Although not explicitly shown in FIG. 1, the communication unit 1320 may be configured to transmit, receive, or both via any wired or wireless communication medium, such as radio frequency (RF), ultraviolet (UV), visible light, fiber optic, wireline, or a combination thereof. Although FIG. 1 shows a single communication unit 1320 and a single communication interface 1370, any number of communication units and any number of communication interfaces may be used. In some embodiments, the communication unit 1320 includes a dedicated short range communications (DSRC) unit, an on-board unit (OBU), or a combination thereof.

The location unit 1310 may determine geolocation information, such as longitude, latitude, elevation, direction of travel, or speed, of the vehicle 1000. In an example, the location unit 1310 includes a GPS unit, such as a Wide Area Augmentation System (WAAS) enabled National Marine-Electronics Association (NMEA) unit, a radio triangulation unit, or a combination thereof. The location unit 1310 can be used to obtain information that represents, for example, a current heading of the vehicle 1000, a current position of the vehicle 1000 in two or three dimensions, a current angular orientation of the vehicle 1000, or a combination thereof.

The user interface 1350 includes any unit capable of interfacing with a person, such as a virtual or physical keypad, a touchpad, a display, a touch display, a heads-up display, a virtual display, an augmented reality display, a haptic display, a feature tracking device, such as an eye-tracking device, a speaker, a microphone, a video camera, a sensor, a printer, or any combination thereof. The user interface 1350 may be operatively coupled with the processor 1330, as shown, or with any other element of the controller 1300. Although shown as a single unit, the user interface 1350 may include one or more physical units. For example, the user interface 1350 may include both an audio interface for performing audio communication with a person and a touch display for performing visual and touch-based communication with the person. The user interface 1350 may include multiple displays, such as multiple physically separate units, multiple defined portions within a single physical unit, or a combination thereof.

The sensors 1360 are operable to provide information that may be used to control the vehicle. The sensors 1360 may be an array of sensors. The sensors 1360 may provide information regarding current operating characteristics of the vehicle 1000, including vehicle operational information. The sensors 1360 can include, for example, a speed sensor, acceleration sensors, a steering angle sensor, traction-related sensors, braking-related sensors, suspension-related sensors, steering wheel position sensors, eye tracking sensors, seating position sensors, or any sensor, or combination of sensors, that are operable to report information regarding some aspect of the current dynamic situation of the vehicle 1000.

The sensors 1360 include one or more sensors that are operable to obtain information regarding the physical environment surrounding the vehicle 1000, such as operational environment information. For example, one or more sensors may detect road geometry, such as lane lines, and obstacles, such as fixed obstacles, vehicles, and pedestrians. The sensors 1360 can be or include one or more video cameras, laser-sensing systems, infrared-sensing systems, acoustic-sensing systems, or any other suitable type of on-vehicle environmental sensing device, or combination of devices, now known or later developed. In some embodiments, the sensors 1360 and the location unit 1310 are combined.

Although not shown separately, the vehicle 1000 may include a trajectory controller. For example, the controller 1300 may include the trajectory controller. The trajectory controller may be operable to obtain information describing a current state of the vehicle 1000 and a route planned for the vehicle 1000, and, based on this information, to determine and optimize a trajectory for the vehicle 1000. In some embodiments, the trajectory controller may output signals operable to control the vehicle 1000 such that the vehicle 1000 follows the trajectory that is determined by the trajectory controller. For example, the output of the trajectory controller can be an optimized trajectory that may be supplied to the powertrain 1200, the wheels 1400, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof.

One or more of the wheels 1400 may be a steered wheel that is pivoted to a steering angle under control of the steering unit 1230, a propelled wheel that is torqued to propel the vehicle 1000 under control of the transmission 1220, or a steered and propelled wheel that may steer and propel the vehicle 1000.

Although not shown in FIG. 1, a vehicle may include additional units or elements not shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

The vehicle 1000 may be an autonomous vehicle that is controlled autonomously, without direct human intervention, to traverse a portion of a vehicle transportation network. Although not shown separately in FIG. 1, an autonomous vehicle may include an autonomous vehicle control unit that performs autonomous vehicle routing, navigation, and control. The autonomous vehicle control unit may be integrated with another unit of the vehicle. For example, the controller 1300 may include the autonomous vehicle control unit.

When present, the autonomous vehicle control unit may control or operate the vehicle 1000 to traverse a portion of the vehicle transportation network in accordance with current vehicle operation parameters. The autonomous vehicle control unit may control or operate the vehicle 1000 to perform a defined operation or maneuver, such as parking the vehicle. The autonomous vehicle control unit may generate a route of travel from an origin, such as a current location of the vehicle 1000, to a destination based on vehicle information, environment information, vehicle transportation network information representing the vehicle transportation network, or a combination thereof, and may control or operate the vehicle 1000 to traverse the vehicle transportation network in accordance with the route. For example, the autonomous vehicle control unit may output the route of travel to the trajectory controller to operate the vehicle 1000 to travel from the origin to the destination using the generated route.

Figure 2:
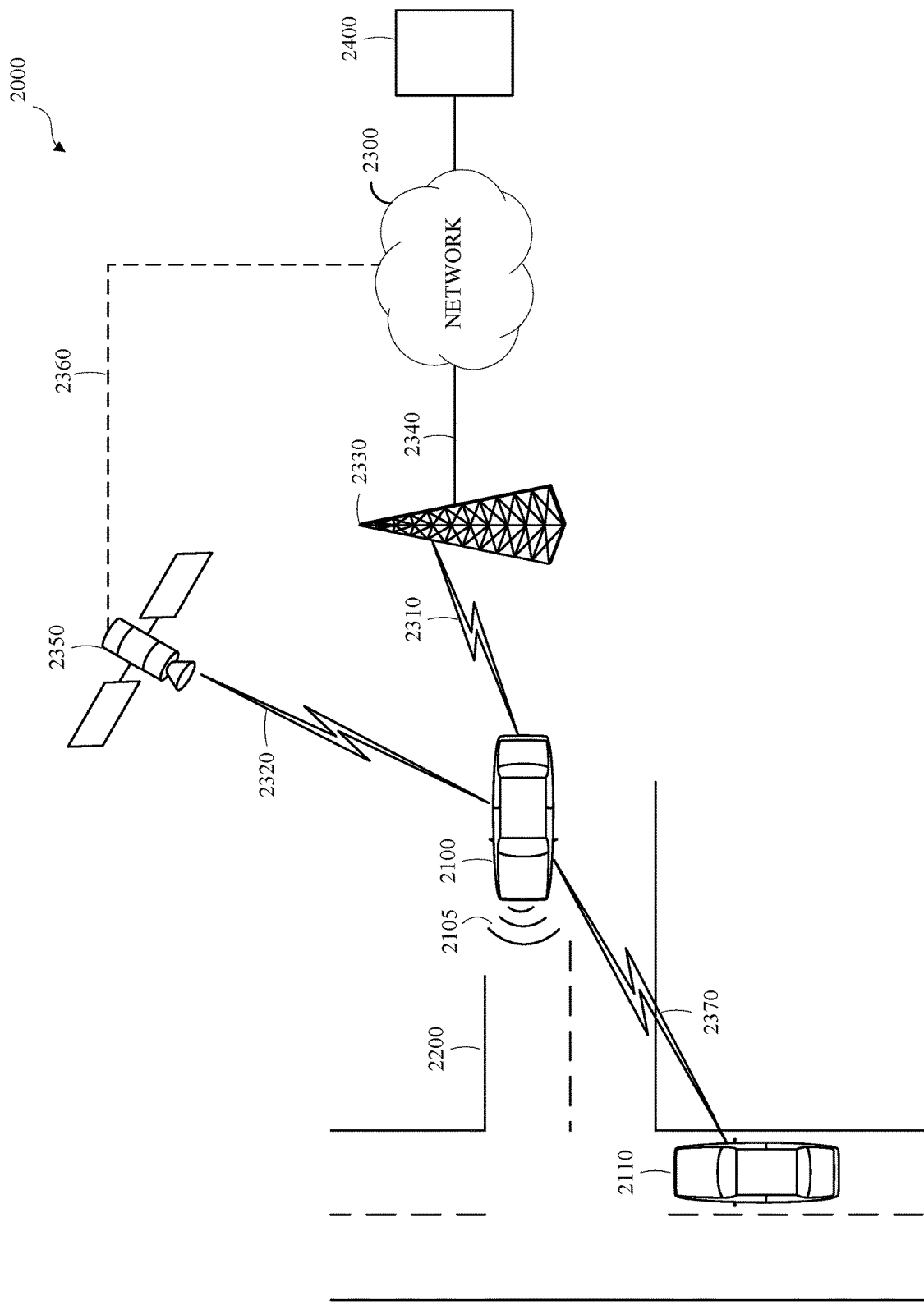
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system in which the aspects, features, and elements disclosed herein may be implemented. The vehicle transportation and communication system 2000 may include one or more vehicles 2100/2110, such as the vehicle 1000 shown in FIG. 1, which travels via one or more portions of the vehicle transportation network 2200, and communicates via one or more electronic communication networks 2300. Although not explicitly shown in FIG. 2, a vehicle may traverse an off-road area.

The electronic communication network 2300 may be, for example, a multiple access system that provides for communication, such as voice communication, data communication, video communication, messaging communication, or a combination thereof, between the vehicle 2100/2110 and one or more communication devices 2400. For example, a vehicle 2100/2110 may receive information, such as information representing the vehicle transportation network 2200, from a communication device 2400 via the network 2300.

In some embodiments, a vehicle 2100/2110 may communicate via a wired communication link (not shown), a wireless communication link 2310/2320/2370, or a combination of any number of wired or wireless communication links. As shown, a vehicle 2100/2110 communicates via a terrestrial wireless communication link 2310, via a non-terrestrial wireless communication link 2320, or via a combination thereof. The terrestrial wireless communication link 2310 may include an Ethernet link, a serial link, a Bluetooth link, an infrared (IR) link, an ultraviolet (UV) link, or any link capable of providing for electronic communication.

A vehicle 2100/2110 may communicate with another vehicle 2100/2110. For example, a host, or subject, vehicle (HV) 2100 may receive one or more automated inter-vehicle messages, such as a basic safety message (BSM), from a remote, or target, vehicle (RV) 2110, via a direct communication link 2370, or via a network 2300. The remote vehicle 2110 may broadcast the message to host vehicles within a defined broadcast range, such as 300 meters. In some embodiments, the host vehicle 2100 may receive a message via a third party, such as a signal repeater (not shown) or another remote vehicle (not shown). A vehicle 2100/2110 may transmit one or more automated inter-vehicle messages periodically, based on, for example, a defined interval, such as 100 milliseconds.

Automated inter-vehicle messages may include vehicle identification information, geospatial state information, such as longitude, latitude, or elevation information, geospatial location accuracy information, kinematic state information, such as vehicle acceleration information, yaw rate information, speed information, vehicle heading information, braking system status information, throttle information, steering wheel angle information, or vehicle routing information, or vehicle operating state information, such as vehicle size information, headlight state information, turn signal information, wiper status information, transmission information, or any other information, or combination of information, relevant to the transmitting vehicle state. For example, transmission state information may indicate whether the transmission of the transmitting vehicle is in a neutral state, a parked state, a forward state, or a reverse state.

The vehicle 2100 may communicate with the communications network 2300 via an access point 2330. The access point 2330, which may include a computing device, is configured to communicate with a vehicle 2100, with a communication network 2300, with one or more communication devices 2400, or with a combination thereof via wired or wireless communication links 2310/2340. For example, the access point 2330 may be a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit here, an access point may include any number of interconnected elements.

The vehicle 2100 may communicate with the communications network 2300 via a satellite 2350, or other non-terrestrial communication device. The satellite 2350, which may include a computing device, is configured to communicate with a vehicle 2100, with a communication network 2300, with one or more communication devices 2400, or with a combination thereof via one or more communication links 2320/2360. Although shown as a single unit here, a satellite may include any number of interconnected elements.

An electronic communication network 2300 is any type of network configured to provide for voice, data, or any other type of electronic communication. For example, the electronic communication network 2300 may include a local area network (LAN), a wide area network (WAN), a virtual private network (VPN), a mobile or cellular telephone network, the Internet, or any other electronic communication system. The electronic communication network 2300 uses a communication protocol, such as the transmission control protocol (TCP), the user datagram protocol (UDP), the internet protocol (IP), the real-time transport protocol (RTP) the HyperText Transport Protocol (HTTP), or a combination thereof. Although shown as a single unit here, an electronic communication network may include any number of interconnected elements.

The vehicle 2100 may identify a portion or condition of the vehicle transportation network 2200. For example, the vehicle includes at least one on-vehicle sensor 2105, like the sensors 1360 shown in FIG. 1, which may be or include a speed sensor, a wheel speed sensor, a camera, a gyroscope, an optical sensor, a laser sensor, a radar sensor, a sonic sensor, or any other sensor or device or combination thereof capable of determining or identifying a portion or condition of the vehicle transportation network 2200. The sensor data may include lane line data, remote vehicle location data, or both.

The vehicle 2100 may traverse a portion or portions of the vehicle transportation network 2200 using information communicated via the network 2300, such as information representing the vehicle transportation network 2200, information identified by one or more on-vehicle sensors 2105, or a combination thereof.

Although FIG. 2 shows one vehicle transportation network 2200, one electronic communication network 2300, and one communication device 2400, for simplicity, any number of networks or communication devices may be used. The vehicle transportation and communication system 2000 may include devices, units, or elements not shown in FIG. 2. Although the vehicle 2100 is shown as a single unit, a vehicle may include any number of interconnected elements.

Although the vehicle 2100 is shown communicating with the communication device 2400 via the network 2300, the vehicle 2100 may communicate with the communication device 2400 via any number of direct or indirect communication links. For example, the vehicle 2100 may communicate with the communication device 2400 via a direct communication link, such as a Bluetooth communication link.

Figure 3:
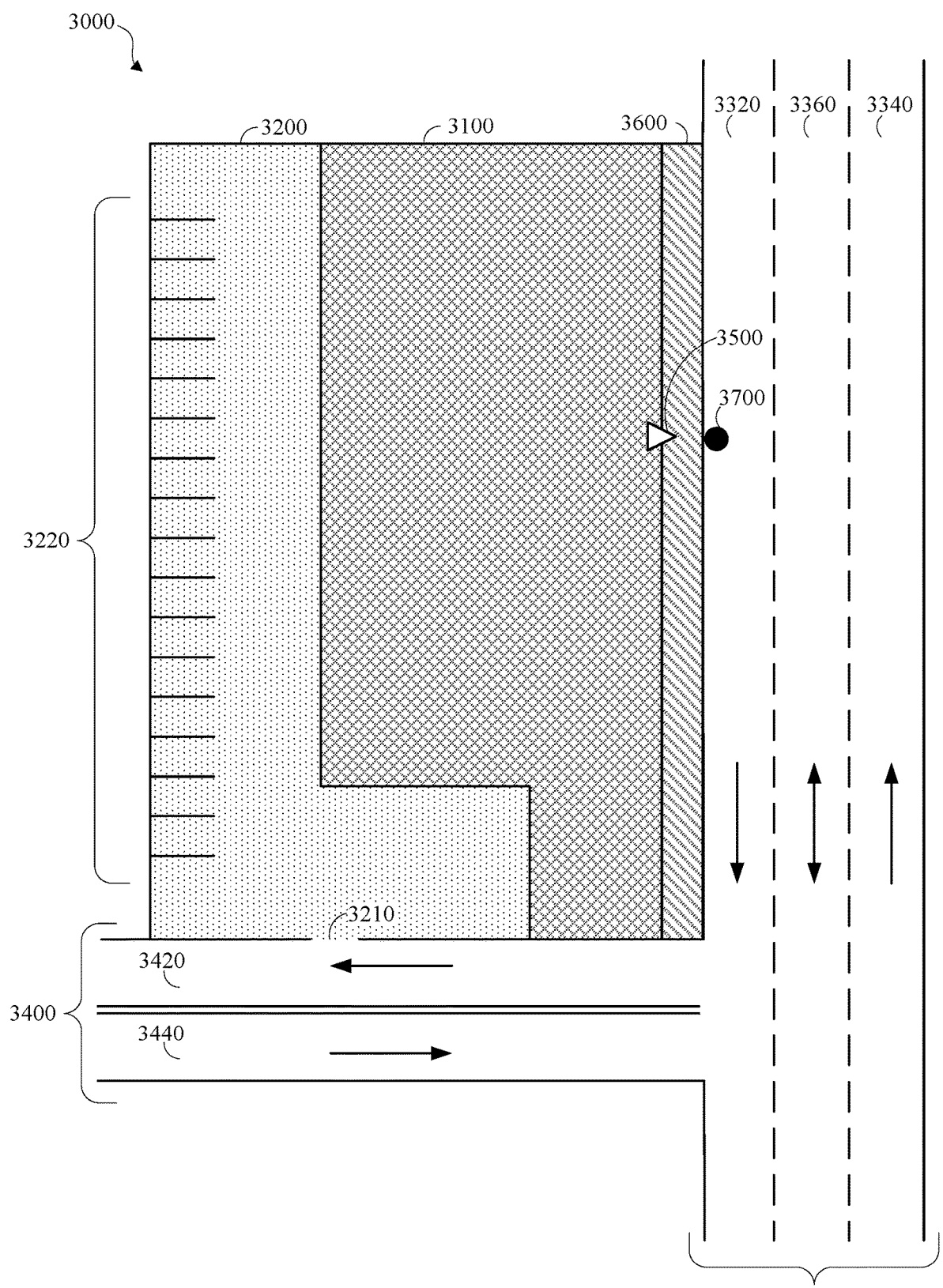
FIG. 3 is a diagram of a portion of a vehicle transportation network in accordance with this disclosure.

FIG. 3 is a diagram of a portion of a vehicle transportation network in accordance with this disclosure. A vehicle transportation network 3000 may include one or more unnavigable areas 3100, such as a building, one or more partially navigable areas, such as parking area 3200, one or more navigable areas, such as roads 3300/3400, or a combination thereof. In some embodiments, an autonomous vehicle, such as the vehicle 1000 shown in FIG. 1, one of the vehicles 2100/2110 shown in FIG. 2, a semi-autonomous vehicle, or any other vehicle implementing autonomous driving, may traverse a portion or portions of the vehicle transportation network 3000.

The vehicle transportation network 3000 may include one or more interchanges 3210 between one or more navigable, or partially navigable, areas 3200/3300/3400. For example, the portion of the vehicle transportation network 300 shown in FIG. 3 includes an interchange 3210 between the parking area 3200 and road 3400. A portion of the vehicle transportation network 3000, such as a road 3300/3400, may include one or more lanes 3320/3340/3360/3420/3440 and may be associated with one or more directions of travel, which are indicated by arrows in FIG. 3.

A vehicle transportation network, or a portion thereof, such as the portion of the vehicle transportation network 3000 shown in FIG. 3, may be represented as vehicle transportation network information. For example, vehicle transportation network information may be expressed as a hierarchy of elements, such as markup language elements, which may be stored in a database or file. For simplicity, the figures herein depict vehicle transportation network information representing portions of a vehicle transportation network as diagrams or maps; however, vehicle transportation network information may be expressed in any computer-usable form capable of representing a vehicle transportation network, or a portion thereof. In some embodiments, the vehicle transportation network information may include vehicle transportation network control information, such as direction of travel information, speed limit information, toll information, grade information, such as inclination or angle information, surface material information, aesthetic information or a combination thereof.

The vehicle transportation network may be associated with, or may include, a pedestrian transportation network. For example, FIG. 3 includes a portion 3600 of a pedestrian transportation network, which may be a pedestrian walkway. Although not shown separately in FIG. 3, a pedestrian navigable area, such as a pedestrian crosswalk, may correspond with a navigable area, or a partially navigable area, of a vehicle transportation network.

In some embodiments, a portion, or a combination of portions, of the vehicle transportation network may be identified as a point of interest or a destination. For example, the vehicle transportation network information may identify a building, such as the unnavigable area 3100, and the adjacent partially navigable parking area 3200 as a point of interest, a vehicle may identify the point of interest as a destination, and the vehicle may travel from an origin to the destination by traversing the vehicle transportation network. Although the parking area 3200 associated with the unnavigable area 3100 is shown as adjacent to the unnavigable area 3100 in FIG. 3, a destination may include, for example, a building and a parking area that is physically or geospatially non-adjacent to the building.

Traversing a portion of the vehicle transportation network may proceed from a topological location estimate of the vehicle to a destination. The destination may be a discrete uniquely identifiable geolocation. For example, the vehicle transportation network may include a defined location, such as a street address, a postal address, a vehicle transportation network address, a GPS address, or a combination thereof for the destination. A destination may be associated with one or more entrances, such as the entrance 3500 shown in FIG. 3.

A destination may be associated with one or more docking locations, such as the docking location 3700 shown in FIG. 3. A docking location 3700 may be a designated or undesignated location or area in proximity to a destination at which a vehicle may stop, stand, or park such that docking operations, such as passenger loading or unloading, may be performed. The vehicle transportation network information may include docking location information, such as information identifying a geolocation of the docking location 3700. Although not shown separately in FIG. 3, docking location information may identify a type of docking operation associated with a docking location 3700. For example, a destination may be associated with a first docking location for passenger loading and a second docking location for passenger unloading.

Figure 4:
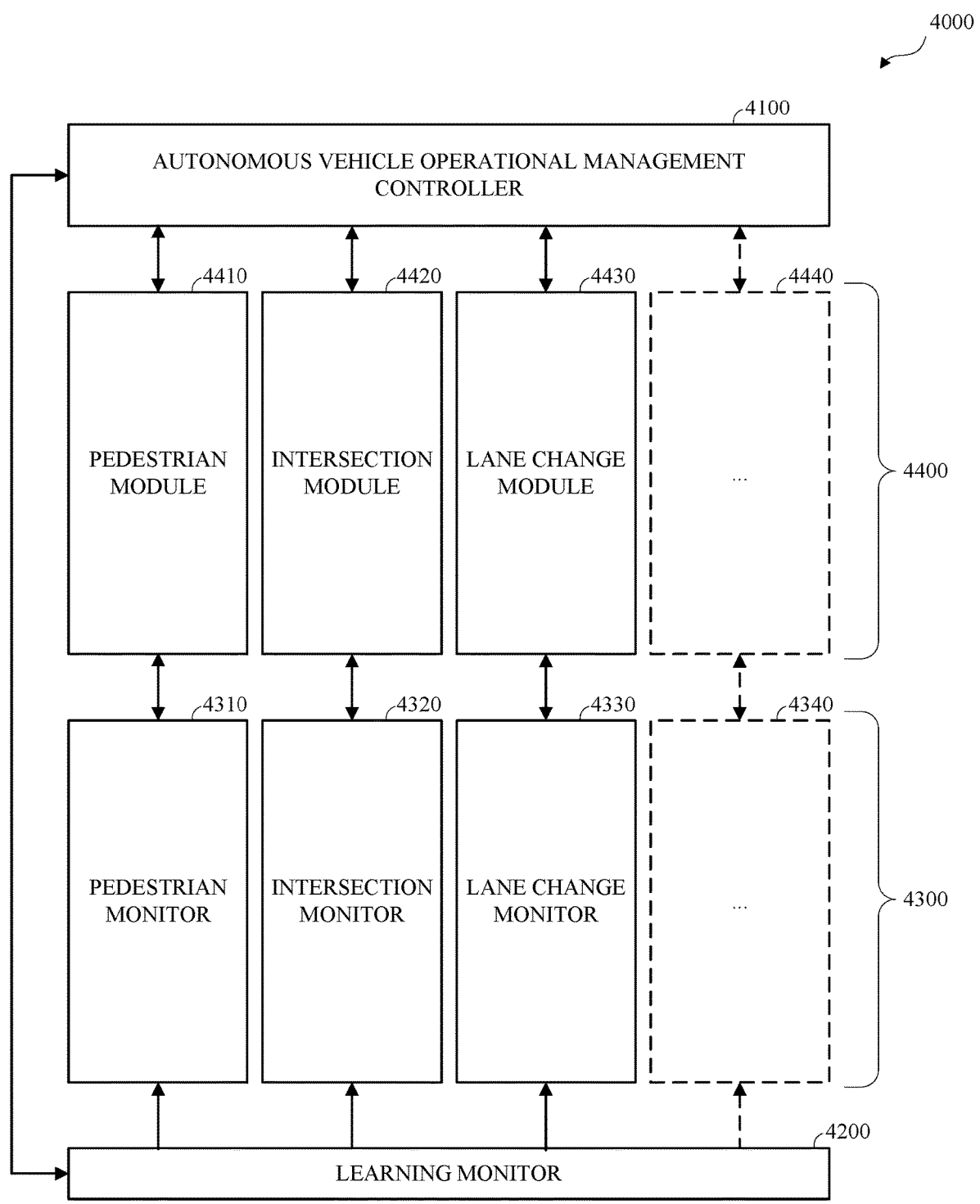
FIG. 4 is a diagram of an example autonomous vehicle operational management system configured for learning in accordance with embodiments of this disclosure.

FIG. 4 is a flow diagram of an example of an autonomous vehicle operational management system 4000 configured for learning in accordance with embodiments of this disclosure. The autonomous vehicle operational management system 4000 may be implemented in an autonomous vehicle, such as the vehicle 1000 shown in FIG. 1, one of the vehicles 2100/2110 shown in FIG. 2, a semi-autonomous vehicle, or any other vehicle implementing autonomous driving.

An autonomous vehicle may traverse a vehicle transportation network, or a portion thereof, which may include traversing distinct vehicle operational scenarios. A distinct vehicle operational scenario may include any distinctly identifiable set of operative conditions that affect the operation of the autonomous vehicle within a defined spatiotemporal area, or operational environment, of the autonomous vehicle. For example, a distinct vehicle operational scenario may be based on a number or cardinality of roads, road segments, or lanes that the autonomous vehicle may traverse within a defined spatiotemporal distance. In another example, a distinct vehicle operational scenario may be based on one or more traffic control devices that may affect the operation of the autonomous vehicle within a defined spatiotemporal area, or operational environment, of the autonomous vehicle. In another example, a distinct vehicle operational scenario may be based on one or more identifiable rules, regulations, or laws that may affect the operation of the autonomous vehicle within a defined spatiotemporal area, or operational environment, of the autonomous vehicle. In another example, a distinct vehicle operational scenario may be based on one or more identifiable external objects that may affect the operation of the autonomous vehicle within a defined spatiotemporal area, or operational environment, of the autonomous vehicle.

Examples of distinct vehicle operational scenarios including a distinct vehicle operational scenario wherein the autonomous vehicle is traversing an intersection; a distinct vehicle operational scenario wherein a pedestrian is crossing, or approaching, the expected path of the autonomous vehicle; and a distinct vehicle operational scenario wherein the autonomous vehicle is changing lanes.

For simplicity and clarity, similar vehicle operational scenarios may be described herein with reference to vehicle operational scenario types or classes. For example, vehicle operational scenarios including pedestrians may be referred to herein as pedestrian scenarios referring to the types or classes of vehicle operational scenarios that include pedestrians. As an example, a first pedestrian vehicle operational scenario may include a pedestrian crossing a road at a crosswalk and as second pedestrian vehicle operational scenario may include a pedestrian crossing a road by jaywalking. Although pedestrian vehicle operational scenarios, intersection vehicle operational scenarios, and lane change vehicle operational scenarios are described herein, any other vehicle operational scenario or vehicle operational scenario type may be used.

Aspects of the operational environment of the autonomous vehicle may be represented within respective distinct vehicle operational scenarios. For example, the relative orientation, trajectory, expected path, of external objects may be represented within respective distinct vehicle operational scenarios. In another example, the relative geometry of the vehicle transportation network may be represented within respective distinct vehicle operational scenarios.

As an example, a first distinct vehicle operational scenario may correspond to a pedestrian crossing a road at a crosswalk, and a relative orientation and expected path of the pedestrian, such as crossing from left to right for crossing from right to left, may be represented within the first distinct vehicle operational scenario. A second distinct vehicle operational scenario may correspond to a pedestrian crossing a road by jaywalking, and a relative orientation and expected path of the pedestrian, such as crossing from left to right for crossing from right to left, may be represented within the second distinct vehicle operational scenario.

An autonomous vehicle may traverse multiple distinct vehicle operational scenarios within an operational environment, which may be aspects of a compound vehicle operational scenario. For example, a pedestrian may approach the expected path for the autonomous vehicle traversing an intersection.

The autonomous vehicle operational management system 4000 may operate or control the autonomous vehicle to traverse the distinct vehicle operational scenarios subject to defined constraints, such as safety constraints, legal constraints, physical constraints, user acceptability constraints, or any other constraint or combination of constraints that may be defined or derived for the operation of the autonomous vehicle.

Controlling the autonomous vehicle to traverse the distinct vehicle operational scenarios may include identifying or detecting the distinct vehicle operational scenarios, identifying candidate vehicle control actions based on the distinct vehicle operational scenarios, controlling the autonomous vehicle to traverse a portion of the vehicle transportation network in accordance with one or more of the candidate vehicle control actions, or a combination thereof.

A vehicle control action may indicate a vehicle control operation or maneuver, such as accelerating, decelerating, turning, stopping, or any other vehicle operation or combination of vehicle operations that may be performed by the autonomous vehicle in conjunction with traversing a portion of the vehicle transportation network.

The autonomous vehicle operational management controller 4100, or another unit of the autonomous vehicle, may control the autonomous vehicle to traverse the vehicle transportation network, or a portion thereof, in accordance with a vehicle control action.

For example, the autonomous vehicle operational management controller 4100 may control the autonomous vehicle to traverse the vehicle transportation network, or a portion thereof, in accordance with a 'stop' vehicle control action by stopping the autonomous vehicle or otherwise controlling the autonomous vehicle to become or remain stationary. Other vehicle control actions may include an 'advance' vehicle control action (e.g., the autonomous vehicle moves a short distance slowly), an 'accelerate' vehicle control action (e.g., a 'go' action), a 'decelerate' vehicle control action, a 'maintain' vehicle control action (e.g., the autonomous vehicle maintains its speed), a 'turn' vehicle control action (which may include an angle of a turn), or any other standard vehicle operations. A vehicle control action may be a compound vehicle control action, which may include a sequence, combination, or both of vehicle control actions. For example, an 'advance' vehicle control action may indicate a 'stop' vehicle control action, a subsequent 'accelerate' vehicle control action associated with a defined acceleration rate, and a subsequent 'stop' vehicle control action associated with a defined deceleration rate, such that controlling the autonomous vehicle in accordance with the 'advance' vehicle control action includes controlling the autonomous vehicle to slowly inch forward a short distance, such as a few inches or a foot.

In another example, the autonomous vehicle operational management controller 4100 may control the autonomous vehicle to traverse the vehicle transportation network, or a portion thereof, in accordance with a 'proceed' vehicle control action by controlling the autonomous vehicle to traverse the vehicle transportation network, or a portion thereof, by beginning or resuming a previously identified set of operational parameters, which may include controlling the autonomous vehicle to traverse the vehicle transportation network, or a portion thereof, in accordance with one or more other vehicle control actions. For example, the autonomous vehicle may be stationary at an intersection, an identified route for the autonomous vehicle may include traversing through the intersection, and controlling the autonomous vehicle in accordance with a 'proceed' vehicle control action may include controlling the autonomous vehicle to accelerate at a defined acceleration rate to a defined velocity along the identified path. In another example, the autonomous vehicle may be traversing a portion of the vehicle transportation network at a defined velocity, a lane change may be identified for the autonomous vehicle, and controlling the autonomous vehicle in accordance with a 'proceed' vehicle control action may include controlling the autonomous vehicle to perform a sequence of trajectory adjustments in accordance with defined lane change parameters such that the autonomous vehicle performs the identified lane change operation.

A vehicle control action may include one or more performance metrics. For example, a 'stop' vehicle control action may include a deceleration rate as a performance metric. In another example, a 'proceed' vehicle control action may expressly indicate route or path information, speed information, an acceleration rate, or a combination thereof as performance metrics, or may expressly or implicitly indicate that a current or previously identified path, speed, acceleration rate, or a combination thereof may be maintained.

A vehicle control action may be a compound vehicle control action, which may include a sequence, combination, or both of vehicle control actions. For example, an 'advance' vehicle control action may indicate a 'stop' vehicle control action, a subsequent 'accelerate' vehicle control action associated with a defined acceleration rate, and a subsequent 'stop' vehicle control action associated with a defined deceleration rate, such that controlling the autonomous vehicle in accordance with the 'advance' vehicle control action includes controlling the autonomous vehicle to slowly inch forward a short distance, such as a few inches or a foot.

The autonomous vehicle operational management system 4000 may include an autonomous vehicle operational management controller 4100, a learning monitor 4200, operational environment monitors 4300, scenario-specific operation control evaluation modules 4400, or a combination thereof. Although described separately, the learning monitor 4200 may be an instance, or instances, of an operational environment monitor 4300.

The autonomous vehicle operational management controller 4100 may receive, identify, or otherwise access, operational environment information representing an operational environment for the autonomous vehicle, such as a current operational environment or an expected operational environment, or one or more aspects thereof. The operational environment of the autonomous vehicle may include a distinctly identifiable set of operative conditions that may affect the operation of the autonomous vehicle within a defined spatiotemporal area of the autonomous vehicle. For example, the operational environment information may include vehicle information for the autonomous vehicle, such as information indicating a geospatial location of the autonomous vehicle, information correlating the geospatial location of the autonomous vehicle to information representing the vehicle transportation network, a route of the autonomous vehicle, a speed of the autonomous vehicle, an acceleration state of the autonomous vehicle, passenger information of the autonomous vehicle, or any other information about the autonomous vehicle or the operation of the autonomous vehicle. In another example, the operational environment information may include information representing the vehicle transportation network proximate to the autonomous vehicle, such as within a defined spatial distance of the autonomous vehicle, such as 300 meters, information indicating the geometry of one or more aspects of the vehicle transportation network, information indicating a condition, such as a surface condition, of the vehicle transportation network, or any combination thereof. In another example, the operational environment information may include information representing external objects within the operational environment of the autonomous vehicle, such as information representing pedestrians, non-human animals, non-motorized transportation devices, such as bicycles or skateboards, motorized transportation devices, such as remote vehicles, or any other external object or entity that may affect the operation of the autonomous vehicle.

The autonomous vehicle operational management controller 4100 may monitor the operational environment of the autonomous vehicle, or defined aspects thereof. Monitoring the operational environment of the autonomous vehicle may include identifying and tracking external objects, identifying distinct vehicle operational scenarios, or a combination thereof. For example, the autonomous vehicle operational management controller 4100 may identify and track external objects with the operational environment of the autonomous vehicle. Identifying and tracking the external objects may include identifying spatiotemporal locations of respective external objects, which may be relative to the autonomous vehicle, identifying one or more expected paths for respective external objects, which may include identifying a speed, a trajectory, or both, for an external object. For simplicity and clarity, descriptions of locations, expected locations, paths, expected paths, and the like herein may omit express indications that the corresponding locations and paths refer to geospatial and temporal components; however, unless expressly indicated herein, or otherwise unambiguously clear from context, the locations, expected locations, paths, expected paths, and the like described herein may include geospatial components, temporal components, or both.

The operational environment monitors 4300 may include an operational environment monitor 4310 for monitoring pedestrians (pedestrian monitor), an operational environment monitor 4320 for monitoring intersections (intersection monitor), an operational environment monitor 4330 for monitoring lane changes (lane change monitor), or a combination thereof. An operational environment monitor 4340 is shown using broken lines to indicate that the autonomous vehicle operational management system 4000 may include any number of operational environment monitors 4300.

One or more distinct vehicle operational scenarios may be monitored by a respective operational environment monitor 4300. For example, the pedestrian monitor 4310 may monitor operational environment information corresponding to multiple pedestrian vehicle operational scenarios, the intersection monitor 4320 may monitor operational environment information corresponding to multiple intersection vehicle operational scenarios, and the lane change monitor 4330 may monitor operational environment information corresponding to multiple lane change vehicle operational scenarios. An operational environment monitor 4300 may receive, or otherwise access, operational environment information, such as operational environment information generated or captured by one or more sensors of the autonomous vehicle, vehicle transportation network information, vehicle transportation network geometry information, or a combination thereof. For example, the operational environment monitor 4310 for monitoring pedestrians may receive, or otherwise access, information, such as sensor information, which may indicate, correspond to, or may otherwise be associated with, one or more pedestrians in the operational environment of the autonomous vehicle.

An operational environment monitor 4300 may associate the operational environment information, or a portion thereof, with the operational environment, or an aspect thereof, such as with an external object, such as a pedestrian, a remote vehicle, or an aspect of the vehicle transportation network geometry. An operational environment monitor 4300 may generate, or otherwise identify, information representing one or more aspects of the operational environment, such as with an external object, such as a pedestrian, a remote vehicle, or an aspect of the vehicle transportation network geometry, which may include filtering, abstracting, or otherwise processing the operational environment information. An operational environment monitor 4300 may output the information representing the one or more aspects of the operational environment to, or for access by, the autonomous vehicle operational management controller 4100, such by storing the information representing the one or more aspects of the operational environment in a memory, such as the memory 1340 shown in FIG. 1, of the autonomous vehicle accessible by the autonomous vehicle operational management controller 4100, sending the information representing the one or more aspects of the operational environment to the autonomous vehicle operational management controller 4100, or a combination thereof. An operational environment monitor 4300 may output the information representing the one or more aspects of the operational environment to one or more elements of the autonomous vehicle operational management system 4000, such as the learning monitor 4200.

The pedestrian operational environment monitor 4310 may correlate, associate, or otherwise process the operational environment information to identify, track, or predict actions of one or more pedestrians. For example, the pedestrian operational environment monitor 4310 may receive information, such as sensor information, from one or more sensors, that may correspond to one or more pedestrians, the pedestrian operational environment monitor 4310 may associate the sensor information with one or more identified pedestrians, which may include identifying a direction of travel, a path, such as an expected path, a current or expected velocity, a current or expected acceleration rate, or a combination thereof for one or more of the respective identified pedestrians, and the pedestrian operational environment monitor 4310 may output the identified, associated, or generated pedestrian information to, or for access by, the autonomous vehicle operational management controller 4100.

In another example, the intersection operational environment monitor 4320 may correlate, associate, or otherwise process the operational environment information to identify, track, or predict actions of one or more remote vehicles in the operational environment of the autonomous vehicle, to identify an intersection, or an aspect thereof, in the operational environment of the autonomous vehicle, to identify vehicle transportation network geometry, or a combination thereof. For example, the intersection operational environment monitor 4310 may receive information, such as sensor information, from one or more sensors, that may correspond to one or more remote vehicles in the operational environment of the autonomous vehicle, the intersection, or one or more aspects thereof, in the operational environment of the autonomous vehicle, the vehicle transportation network geometry, or a combination thereof, the intersection operational environment monitor 4310 may associate the sensor information with one or more identified remote vehicles in the operational environment of the autonomous vehicle, the intersection, or one or more aspects thereof, in the operational environment of the autonomous vehicle, the vehicle transportation network geometry, or a combination thereof, which may include may identifying a current or expected direction of travel, a path, such as an expected path, a current or expected velocity, a current or expected acceleration rate, or a combination thereof for one or more of the respective identified remote vehicles, and the intersection operational environment monitor 4320 may output the identified, associated, or generated intersection information to, or for access by, the autonomous vehicle operational management controller 4100.

In another example, the lane change operational environment monitor 4330 may correlate, associate, or otherwise process the operational environment information to identify, track, or predict actions of one or more remote vehicles in the operational environment of the autonomous vehicle, such as information indicating a slow or stationary remote vehicle along the expected path of the autonomous vehicle, to identify one or more aspects of the operational environment of the autonomous vehicle, such as vehicle transportation network geometry in the operational environment of the autonomous vehicle, or a combination thereof geospatially corresponding to a current or expected lane change operation. For example, the lane change operational environment monitor 4330 may receive information, such as sensor information, from one or more sensors, that may correspond to one or more remote vehicles in the operational environment of the autonomous vehicle, one or more aspects of the operational environment of the autonomous vehicle in the operational environment of the autonomous vehicle or a combination thereof geospatially corresponding to a current or expected lane change operation, the lane change operational environment monitor 4330 may associate the sensor information with one or more identified remote vehicles in the operational environment of the autonomous vehicle, one or more aspects of the operational environment of the autonomous vehicle or a combination thereof geospatially corresponding to a current or expected lane change operation, which may include may identifying a current or expected direction of travel, a path, such as an expected path, a current or expected velocity, a current or expected acceleration rate, or a combination thereof for one or more of the respective identified remote vehicles, and the lane change operational environment monitor 4330 may output the identified, associated, or generated lane change information to, or for access by, the autonomous vehicle operational management controller 4100.

The autonomous vehicle operational management controller 4100 may identify one or more distinct vehicle operational scenarios based on one or more aspects of the operational environment represented by the operational environment information. For example, the autonomous vehicle operational management controller 4100 may identify a distinct vehicle operational scenario in response to identifying, or based on, the operational environment information indicated by one or more of the operational environment monitors 4300.

The autonomous vehicle operational management controller 4100 may identify multiple distinct vehicle operational scenarios based on one or more aspects of the operational environment represented by the operational environment information. For example, the operational environment information may include information representing a pedestrian approaching an intersection along an expected path for the autonomous vehicle, and the autonomous vehicle operational management controller 4100 may identify a pedestrian vehicle operational scenario, an intersection vehicle operational scenario, or both.

The autonomous vehicle operational management controller 4100 may instantiate respective instances of one or more of the scenario-specific operational control evaluation modules 4400 based on one or more aspects of the operational environment represented by the operational environment information. For example, the autonomous vehicle operational management controller 4100 may instantiate the instance of the scenario-specific operational control evaluation module 4400 in response to identifying the distinct vehicle operational scenario.

The autonomous vehicle operational management controller 4100 may instantiate multiple instances of one or more scenario-specific operational control evaluation modules 4400 (SSOCEM 4400) based on one or more aspects of the operational environment represented by the operational environment information. For example, the autonomous vehicle operational management controller 4100 may instantiate the instance of the scenario-specific operational control evaluation module 4400 in response to identifying the distinct vehicle operational scenario. A SSOCEM 4400, once instantiated, can receive operational environment information, including sensor data, to output a candidate vehicle control action. A candidate vehicle control action is a vehicle control action that is identified by the particular SSOCEM 4400 as the likely optimal action for the vehicle to perform to handle a particular scenario. For instance, a SSOCEM 4400 configured to handle intersections (e.g., an intersection module 4420) may output a "proceed" candidate vehicle control action that suggests proceeding through an intersection. At the same time, a SSOCEM 4400 for handling lane changes (e.g., the lane change module 4430) may output a "turn left" candidate vehicle control action indicating that the autonomous vehicle should merge left by two degrees. The SSOCEM 4400 may include an a pedestrian module 4410, an intersection module 4420, lane change module 4430, or a combination thereof. A SSOCEM 4440 is shown using broken lines to indicate that the autonomous vehicle operational management system 4000 may include any number of SSOCEM 4400.

In some implementations, each SSOCEM 4400 outputs a confidence score indicating a degree of confidence in the candidate vehicle control action determined by the SSOCEM. For instance, a confidence score greater than 0.95 may indicate a very high confidence in the candidate vehicle control action, while a confidence score less than 0.5 may indicate a relatively low degree of confidence in the candidate vehicle control action.

The autonomous vehicle operational management controller 4100 receives the candidate vehicle control actions and determines a vehicle control action based on the candidate vehicle control actions. In some implementations, the autonomous vehicle operational management controller 4100 utilizes hard coded rules to determine the vehicle control action. For example, the autonomous vehicle operational management controller 4100 may select the candidate vehicle control action having the highest confidence score. In other implementations, the autonomous vehicle operational management controller 4100 may select the candidate vehicle control action that is the least likely to result in a collision. In other implementations, the autonomous vehicle operational management controller 4100 may generate a compound action based on two or more non-conflicting candidate vehicle control actions (e.g., compounding "proceed" and "turn left by two degrees" to result in a vehicle control action that causes the vehicle to veer left and proceed through an intersection). In some implementations, the autonomous vehicle operational management controller 4100 may utilize a machine learning algorithm to determine a vehicle control action based on two or more differing candidate vehicle control actions.

A scenario-specific operational control evaluation module 4400 may include one or more models that are configured to determine one or more vehicle control actions for handling a scenario given a set of inputs. The models may include, but are not limited to, Partially Observable Markov Decision Process (POMDP), Markov Decision Process (MDP), artificial neural networks, hard-coded expert logic, or any other suitable types of models. Each scenario-specific operational control evaluation module 4400 may further include computer-executable instructions for determining whether to utilize the model. Each scenario-specific operational control evaluation module 4400 includes computer-executable instructions that define a manner by which the models operate and a manner by which the models are utilized.

The operational environment information may indicate two pedestrians in the operational environment of the autonomous vehicle and the autonomous vehicle operational management controller 4100 may instantiate a respective instance of the pedestrian-scenario-specific operational control evaluation module 4410 for each pedestrian based on one or more aspects of the operational environment represented by the operational environment information.

The cardinality, number, or count, of identified external objects, such as pedestrians or remote vehicles, corresponding to a scenario, such as the pedestrian scenario, the intersection scenario, or the lane change scenario, may exceed a defined threshold, which may be a defined scenario-specific threshold, and the autonomous vehicle operational management controller 4100 may omit instantiating an instance of a scenario-specific operational control evaluation module 4400 corresponding to one or more of the identified external objects.

For example, the operational environment information indicated by the operational environment monitors 4300 may indicate twenty-five pedestrians in the operational environment of the autonomous vehicle, the defined threshold for the pedestrian scenario may be a defined cardinality, such as ten, of pedestrians, the autonomous vehicle operational management controller 4100 may identify the ten most relevant pedestrians, such as the ten pedestrians geospatially most proximate to the autonomous vehicle having converging expected paths with the autonomous vehicle, the autonomous vehicle operational management controller 4100 may instantiate ten instances of the pedestrian-scenario-specific operational control evaluation module 4410 for the ten most relevant pedestrians, and the autonomous vehicle operational management controller 4100 may omit instantiating instances of the pedestrian-scenario-specific operational control evaluation module 4410 for the fifteen other pedestrians.

In another example, the operational environment information indicated by the operational environment monitors 4300 may indicate an intersection including four road segments, such as a northbound road segment, a southbound road segment, an eastbound road segment, and a westbound road segment, and indicating five remote vehicles corresponding to the northbound road segment, three remote vehicles corresponding to the southbound road segment, four remote vehicles corresponding to the eastbound road segment, and two remote vehicles corresponding to the westbound road segment, the defined threshold for the intersection scenario may be a defined cardinality, such as two, of remote vehicles per road segment, the autonomous vehicle operational management controller 4100 may identify the two most relevant remote vehicles per road segment, such as the two remote vehicles geospatially most proximate to the intersection having converging expected paths with the autonomous vehicle per road segment, the autonomous vehicle operational management controller 4100 may instantiate two instances of the intersection-scenario-specific operational control evaluation module 4420 for the two most relevant remote vehicles corresponding to the northbound road segment, two instances of the intersection-scenario-specific operational control evaluation module 4420 for the two most relevant remote vehicles corresponding to the southbound road segment, two instances of the intersection-scenario-specific operational control evaluation module 4420 for the two most relevant remote vehicles corresponding to the eastbound road segment, and two instances of the intersection-scenario-specific operational control evaluation module 4420 for the two remote vehicles corresponding to the westbound road segment, and the autonomous vehicle operational management controller 4100 may omit instantiating instances of the intersection-scenario-specific operational control evaluation module 4420 for the three other remote vehicles corresponding to the northbound road segment, the other remote vehicle corresponding to the southbound road segment, and the two other remote vehicles corresponding to the eastbound road segment. Alternatively, or in addition, the defined threshold for the intersection scenario may be a defined cardinality, such as eight, remote vehicles per intersection, and the autonomous vehicle operational management controller 4100 may identify the eight most relevant remote vehicles for the intersection, such as the eight remote vehicles geospatially most proximate to the intersection having converging expected paths with the autonomous vehicle, the autonomous vehicle operational management controller 4100 may instantiate eight instances of the intersection-scenario-specific operational control evaluation module 4420 for the eight most relevant remote vehicles, and the autonomous vehicle operational management controller 4100 may omit instantiating instances of the intersection-scenario-specific operational control evaluation module 4420 for the six other remote vehicles.

The autonomous vehicle operational management controller 4100 may send the operational environment information, or one or more aspects thereof, to another unit of the autonomous vehicle, such as the learning monitor 4200 or one or more instances of the SSOCEM 4400.

The autonomous vehicle operational management controller 4100 may store the operational environment information, or one or more aspects thereof, such as in a memory, such as the memory 1340 shown in FIG. 1, of the autonomous vehicle.

The autonomous vehicle operational management controller 4100 may receive candidate vehicle control actions from respective instances of the SSOCEM 4400. For example, a candidate vehicle control action from a first instance of a first SSOCEM 4400 may indicate a 'stop' vehicle control action, a candidate vehicle control action from a second instance of a second SSOCEM 4400 may indicate an 'advance' vehicle control action, and a candidate vehicle control action from a third instance of a third SSOCEM 4400 may indicate a 'proceed' vehicle control action.

The autonomous vehicle operational management controller 4100 may determine whether to traverse a portion of the vehicle transportation network in accordance with one or more candidate vehicle control actions. For example, the autonomous vehicle operational management controller 4100 may receive multiple candidate vehicle control actions from multiple instances of SSOCEM s 4400, may identify a vehicle control action from the candidate vehicle control actions, and may traverse the vehicle transportation network in accordance with the vehicle control action.

The autonomous vehicle operational management controller 4100 may identify a vehicle control action from the candidate vehicle control actions based on one or more defined vehicle control action identification metrics.

The defined vehicle control action identification metrics may include a priority, weight, or rank, associated with each type of vehicle control action, and identifying the vehicle control action from the candidate vehicle control actions may include identifying a highest priority vehicle control action from the candidate vehicle control actions. For example, the 'stop' vehicle control action may be associated with a high priority, the 'advance' vehicle control action may be associated with an intermediate priority, which may be lower than the high priority, and the 'proceed' vehicle control action may be associated with a low priority, which may be lower than the intermediate priority. In an example, the candidate vehicle control actions may include one or more 'stop' vehicle control actions, and the 'stop' vehicle control action may be identified as the vehicle control action. In another example, the candidate vehicle control actions may omit a 'stop' vehicle control action, may include one or more 'advance' vehicle control actions, and the 'advance' vehicle control action may be identified as the vehicle control action. In another example, the candidate vehicle control actions may omit a 'stop' vehicle control action, may omit an 'advance' vehicle control action, may include one or more 'proceed' vehicle control actions, and the 'proceed' vehicle control action may be identified as the vehicle control action.

Identifying the vehicle control action from the candidate vehicle control actions may include generating or calculating a weighted average for each type of vehicle control action based on the defined vehicle control action identification metrics, the instantiated scenarios, weights associated with the instantiated scenarios, the candidate vehicle control actions, weights associated with the candidate vehicle control actions, or a combination thereof.

For example, identifying the vehicle control action from the candidate vehicle control actions may include implementing a machine learning component, such as supervised learning of a classification problem, and training the machine learning component using examples, such as 1000 examples, of the corresponding vehicle operational scenario. In another example, identifying the vehicle control action from the candidate vehicle control actions may include implementing an MDP or a POMDP, which may describe how respective candidate vehicle control actions affect subsequent candidate vehicle control actions affect, and may include a reward function that outputs a positive or negative reward for respective vehicle control actions.

The autonomous vehicle operational management controller 4100 may uninstantiate an instance of a scenario-specific operational control evaluation module 4400. For example, the autonomous vehicle operational management controller 4100 may identify a distinct set of operative conditions as indicating a distinct vehicle operational scenario for the autonomous vehicle, instantiate an instance of a SSOCEM 4400 for the distinct vehicle operational scenario, monitor the operative conditions, subsequently determine that one or more of the operative conditions has expired, or has a probability of affecting the operation of the autonomous vehicle below a defined threshold, and the autonomous vehicle operational management controller 4100 may uninstantiate the instance of the SSOCEM 4400.

The learning monitor 4200 may receive operational environment information representing an operational environment, or an aspect thereof, for the autonomous vehicle. For example, the learning monitor 4200 may receive the operational environment information from the autonomous vehicle operational management controller 4100, from a sensor of the autonomous vehicle, from an external device, such as a remote vehicle or an infrastructure device, or a combination thereof. In some embodiments, the learning monitor 4200 may read the operational environment information, or a portion thereof, from a memory, such as a memory of the autonomous vehicle, such as the memory 1340 shown in FIG. 1.

Although not expressly shown in FIG. 4, the autonomous vehicle operational management system 4000 may include a predictor module that may generate and send prediction information to the learning monitor 4200, and the learning monitor 4200 may output probability of a vehicle control action based on a stored observation of the operational environment.

The learning monitor 4200 may determine a respective probability of a vehicle control action, for one or more portions of the vehicle transportation network, such as portions of the vehicle transportation network proximal to the autonomous vehicle, which may include portions of the vehicle transportation network corresponding to an expected path of the autonomous vehicle, such as an expected path identified based on a current route of the autonomous vehicle.

A probability of a vehicle control action, may indicate a probability or likelihood that the autonomous vehicle may traverse a portion of, or spatial location within, the vehicle transportation network safely, such as unimpeded by an external object, such as a remote vehicle or a pedestrian. For example, a portion of the vehicle transportation network may include an obstruction, such as a stationary object, and a probability of traversal via the obstructed portion of the vehicle transportation network may be low, such as 0%. The learning monitor 4200 may identify a respective probability of traversal for each of multiple portions of the vehicle transportation network within an operational environment, such as within 300 meters, of the autonomous vehicle.

The learning monitor 4200 may identify a portion of the vehicle transportation network and a corresponding probability of traversal based on operating information for the autonomous vehicle, operating information for one or more external objects, vehicle transportation network information representing the vehicle transportation network, or a combination thereof. The operating information for the autonomous vehicle may include information indicating a geospatial location of the autonomous vehicle in the vehicle transportation network, which may be a current location or an expected location, such as an expected location identified based on an expected path for the autonomous vehicle. The operating information for the external objects may indicate a respective geospatial location of one or more external objects in, or proximate to, the vehicle transportation network, which may be a current location or an expected location, such as an expected location identified based on an expected path for the respective external object.

A probability of traversal may be indicated by the learning monitor 4200 corresponding to each external object in the operational environment of the autonomous vehicle and a geospatial area may be associated with multiple probabilities of traversal corresponding to multiple external objects. An aggregate probability of traversal may be indicated by the learning monitor 4200 corresponding to each type of external object in the operational environment of the autonomous vehicle, such as a probability of traversal for pedestrians and a probability of traversal for remote vehicles, and a geospatial area may be associated with multiple probabilities of traversal corresponding to multiple external object types. In some embodiments, the learning monitor 4200 may indicate one aggregate probability of traversal for each geospatial location, which may include multiple temporal probabilities of traversal for a geographical location.

The learning monitor 4200 may identify external objects, track external objects, project location information, path information, or both for external objects, or a combination thereof. For example, the learning monitor 4200 may identify an external object and may identify an expected path for the external object, which may indicate a sequence of expected spatial locations, expected temporal locations, and corresponding probabilities.

The learning monitor 4200 may identify the expected path for an external object based on operational environment information, such as information indicating a current location of the external object, information indicating a current trajectory for the external object, information indicating a type of classification of the external object, such as information classifying the external object as a pedestrian or a remote vehicle, vehicle transportation network information, such as information indicating that the vehicle transportation network includes a crosswalk proximate to the external object, previously identified or tracked information associated with the external object, or any combination thereof. For example, the external object may be identified as a remote vehicle, and the expected path for the remote vehicle may be identified based on information indicating a current location of the remote vehicle, information indicating a current trajectory of the remote vehicle, information indicating a current speed of the remote vehicle, vehicle transportation network information corresponding to the remote vehicle, legal or regulatory information, or a combination thereof.

The learning monitor 4200 may receive the expected path for an external object based on operational environment information, such as information indicating a current location of the external object, information indicating a current trajectory for the external object, information indicating a type of classification of the external object, such as information classifying the external object as a pedestrian or a remote vehicle, vehicle transportation network information, such as information indicating that the vehicle transportation network includes a crosswalk proximate to the external object, previously identified or tracked information associated with the external object, or any combination thereof. For example, the external object may a remote vehicle, and the expected path for the remote vehicle may be received based on information indicating a current location of the remote vehicle, information indicating a current trajectory of the remote vehicle, information indicating a current speed of the remote vehicle, vehicle transportation network information corresponding to the remote vehicle, legal or regulatory information, or a combination thereof.

The learning monitor 4200 may determine, or update, probabilities of traversal continually or periodically. One or more classes or types of external object may be identified as a preferential object, and the expected path of a preferential object may overlap, spatially and temporally, the expected path of another preferential object. For example, the expected path of a pedestrian may overlap with the expected path of another pedestrian. One or more classes or types of external object may be identified as a deferential object, and the expected path of a deferential object may be blocked, such as impeded or otherwise affected, by other external objects. For example, the expected path for a remote vehicle may be blocked by another remote vehicle or by a pedestrian.

The learning monitor 4200 may identify expected paths for preferential objects, such as pedestrians, and may identify expected paths for deferential objects, such as remote vehicles, subject to the expected paths for the preferential objects. The learning monitor 4200 may communicate probabilities of traversal to the autonomous vehicle operational management controller 4100. The autonomous vehicle operational management controller 4100 may communicate the probabilities of traversal to respective instantiated instances of the scenario-specific operational control evaluation modules 4400.

Each scenario-specific operational control evaluation module 4400 may model a respective distinct vehicle operational scenario. The autonomous vehicle operational management system 4000 may include any number of SSOCEMs 4400, each modeling a respective distinct vehicle operational scenario.

Modeling a distinct vehicle operational scenario, by a SSOCEM 4400, may include generating, maintaining, or both state information representing aspects of an operational environment of the autonomous vehicle corresponding to the distinct vehicle operational scenario, identifying potential interactions among the modeled aspects respective of the corresponding states, and determining a candidate vehicle control action that solves the model. In some embodiments, aspects of the operational environment of the autonomous vehicle other than the defined set of aspects of the operational environment of the autonomous vehicle corresponding to the distinct vehicle operational scenario may be omitted from the model.

The autonomous vehicle operational management system 4000 may be solution independent and may include any model of a distinct vehicle operational scenario, such as a single-agent model, a multi-agent model, a learning model, or any other model of one or more distinct vehicle operational scenarios.

One or more of the SSOCEMs 4400 may be a Classical Planning (CP) model, which may be a single-agent model, and which may model a distinct vehicle operational scenario based on a defined input state, which may indicate respective non-probabilistic states of the elements of the operational environment of the autonomous vehicle for the distinct vehicle operational scenario modeled by the scenario-specific operational control evaluation modules 4400. In a CP model, one or more aspects, such as geospatial location, of modeled elements, such as external objects, associated with a temporal location may differ from the corresponding aspects associated with another temporal location, such as an immediately subsequent temporal location, non-probabilistically, such as by a defined, or fixed, amount. For example, at a first temporal location, a remote vehicle may have a first geospatial location, and, at an immediately subsequent second temporal location the remote vehicle may have a second geospatial location that differs from the first geospatial location by a defined geospatial distance, such as a defined number of meters, along an expected path for the remote vehicle.

One or more of the SSOCEMs 4400 may be a discrete time stochastic control process, such as an MDP model, which may be a single-agent model, and which may model a distinct vehicle operational scenario based on a defined input state. Changes to the operational environment of the autonomous vehicle, such as a change of location for an external object, may be modeled as probabilistic changes. An MDP model may utilize more processing resources and may more accurately model the distinct vehicle operational scenario than a CP model.

An MDP model may model a distinct vehicle operational scenario as a sequence of temporal locations, such as a current temporal location, future temporal locations, or both, with corresponding states, such as a current state, expected future states, or both. At each temporal location the model may have a state, which may be an expected state, and which may be associated with one or more candidate vehicle control actions. The model may represent the autonomous vehicle as an agent, which may transition, along the sequence of temporal locations, from one state (a current state) to another state (subsequent state) in accordance with an identified action for the current state and a probability that the identified action will transition the state from the current state to the subsequent state.

The model may accrue a reward, which may be a positive or negative value, corresponding to transitioning from the one state to another according to a respective action. The model may solve the distinct vehicle operational scenario by identifying the actions corresponding to each state in the sequence of temporal locations that maximizes the cumulative reward. Solving a model may include identifying a vehicle control action in response to the modeled scenario and the operational environment information.

An MDP model may model a distinct vehicle operational scenario using a set of states, a set of actions, a set of state transition probabilities, a reward function, or a combination thereof. In some embodiments, modeling a distinct vehicle operational scenario may include using a discount factor, which may adjust, or discount, the output of the reward function applied to subsequent temporal periods.

The set of states may include a current state of the MDP model, one or more possible subsequent states of the MDP model, or a combination thereof. A state may represent an identified condition, which may be an expected condition, of respective defined aspects, such as external objects and traffic control devices, of the operational environment of the autonomous vehicle that may probabilistically affect the operation of the autonomous vehicle at a discrete temporal location. For example, a remote vehicle operating in the proximity of the autonomous vehicle may affect the operation of the autonomous vehicle and may be represented in an MDP model, which may include representing an identified or expected geospatial location of the remote vehicle, an identified or expected path, heading, or both of the remote vehicle, an identified or expected velocity of the remote vehicle, an identified or expected acceleration or deceleration rate of the remote vehicle, or a combination thereof corresponding to the respected temporal location. At instantiation, the current state of the MDP model may correspond to a contemporaneous state or condition of the operating environment. A respective set of states may be defined for each distinct vehicle operational scenario.

Although any number or cardinality of states may be used, the number or cardinality of states included in a model may be limited to a defined maximum number of states, such as 300 states. For example, a model may include the 300 most probable states for a corresponding scenario.

The set of actions may include vehicle control actions available to the MDP model at each state in the set of states. A respective set of actions may be defined for each distinct vehicle operational scenario.

The set of state transition probabilities may probabilistically represent potential or expected changes to the operational environment of the autonomous vehicle, as represented by the states, responsive to the actions. For example, a state transition probability may indicate a probability that the operational environment of the autonomous vehicle corresponds to a respective state at a respective temporal location immediately subsequent to a current temporal location corresponding to a current state in response to traversing the vehicle transportation network by the autonomous vehicle from the current state in accordance with a respective action.

The set of state transition probabilities may be identified based on the operational environment information. For example, the operational environment information may indicate an area type, such as urban or rural, a time of day, an ambient light level, weather conditions, traffic conditions, which may include expected traffic conditions, such as rush hour conditions, event-related traffic congestion, or holiday related driver behavior conditions, road conditions, jurisdictional conditions, such as country, state, or municipality conditions, or any other condition or combination of conditions that may affect the operation of the autonomous vehicle.

Examples of state transition probabilities associated with a pedestrian vehicle operational scenario may include a defined probability of a pedestrian jaywalking, which may be based on a geospatial distance between the pedestrian and the respective road segment; a defined probability of a pedestrian stopping in an intersection; a defined probability of a pedestrian crossing at a crosswalk; a defined probability of a pedestrian yielding to the autonomous vehicle at a crosswalk; any other probability associated with a pedestrian vehicle operational scenario.

Examples of state transition probabilities associated with an intersection vehicle operational scenario may include a defined probability of a remote vehicle arriving at an intersection; a defined probability of a remote vehicle cutting-off the autonomous vehicle; a defined probability of a remote vehicle traversing an intersection immediately subsequent to, and in close proximity to, a second remote vehicle traversing the intersection, such as in the absence of a right-of-way (piggybacking); a defined probability of a remote vehicle stopping, adjacent to the intersection, in accordance with a traffic control device, regulation, or other indication of right-of-way, prior to traversing the intersection; a defined probability of a remote vehicle traversing the intersection; a defined probability of a remote vehicle diverging from an expected path proximal to the intersection; a defined probability of a remote vehicle diverging from an expected right-of-way priority; any other probability associated with a an intersection vehicle operational scenario.

Examples of state transition probabilities associated with a lane change vehicle operational scenario may include a defined probability of a remote vehicle changing velocity, such as a defined probability of a remote vehicle behind the autonomous vehicle increasing velocity or a defined probability of a remote vehicle in front of the autonomous vehicle decreasing velocity; a defined probability of a remote vehicle in front of the autonomous vehicle changing lanes; a defined probability of a remote vehicle proximate to the autonomous vehicle changing speed to allow the autonomous vehicle to merge into a lane; or any other probabilities associated with a lane change vehicle operational scenario.

The reward function may determine a respective positive or negative (cost) value that may be accrued for each combination of state and action, which may represent an expected value of the autonomous vehicle traversing the vehicle transportation network from the corresponding state in accordance with the corresponding vehicle control action to the subsequent state.

The reward function may be identified based on the operational environment information. For example, the operational environment information may indicate an area type, such as urban or rural, a time of day, an ambient light level, weather conditions, traffic conditions, which may include expected traffic conditions, such as rush hour conditions, event-related traffic congestion, or holiday related driver behavior conditions, road conditions, jurisdictional conditions, such as country, state, or municipality conditions, or any other condition or combination of conditions that may affect the operation of the autonomous vehicle.

One or more of the SSOCEMs 4400 may be a POMDP model, which may be a single-agent model. A POMDP model may be similar to an MDP model, except that a POMDP model may include modeling uncertain states. A POMDP model may include modeling confidence, sensor trustworthiness, distraction, noise, uncertainty, such as sensor uncertainty, or the like. A POMDP model may utilize more processing resources and may more accurately model the distinct vehicle operational scenario than an MDP model.

A POMDP model may model a distinct vehicle operational scenario using a set of states, a set of states, a set of actions, a set of state transition probabilities, a reward function, a set of observations, a set of conditional observation probabilities, or a combination thereof. The set of states, the set of actions, the set of state transition probabilities, and the reward function may be similar to those described above with respect to the MDP model.

The set of observations may include observations corresponding to respective states. An observation may provide information about the attributes of a respective state. An observation may correspond with a respective temporal location. An observation may include operational environment information, such as sensor information. An observation may include expected or predicted operational environment information.

For example, a POMDP model may include an autonomous vehicle at a first geospatial location and first temporal location corresponding to a first state, the model may indicate that the autonomous vehicle may identify and perform, or attempt to perform, a vehicle control action to traverse the vehicle transportation network from the first geospatial location to a second geospatial location at a second temporal location immediately subsequent to the first temporal location, and the set of observations corresponding to the second temporal location may include the operational environment information that may be identified corresponding to the second temporal location, such as geospatial location information for the autonomous vehicle, geospatial location information for one or more external objects, probabilities of traversal, expected path information, or the like. The POMDP model may be used to determine a belief path based on sensor data, user demonstration data, or both. User demonstration data is data associated with a sequence of actions and probability distributions of a current state of the autonomous vehicle.

The set of conditional observation probabilities may include probabilities of making respective observations based on the operational environment of the autonomous vehicle. For example, an autonomous vehicle may approach an intersection by traversing a first road, contemporaneously, a remote vehicle may approach the intersection by traversing a second road, the autonomous vehicle may identify and evaluate operational environment information, such as sensor information, corresponding to the intersection, which may include operational environment information corresponding to the remote vehicle. In some embodiments, the operational environment information may be inaccurate, incomplete, or erroneous. In an MDP model, the autonomous vehicle may non-probabilistically identify the remote vehicle, which may include identifying a location of the remote vehicle, an expected path for the remote vehicle, or the like, and the identified information, such as the identified location of the remote vehicle, based on inaccurate operational environment information, may be inaccurate or erroneous. In a POMDP model the autonomous vehicle may identify information probabilistically identifying the remote vehicle, which may include probabilistically identifying location information for the remote vehicle, such as location information indicating that the remote vehicle may be proximate to the intersection. The conditional observation probability corresponding to observing, or probabilistically identifying, the location of the remote vehicle may represent the probability that the identified operational environment information accurately represents the location of the remote vehicle.

The set of conditional observation probabilities may be identified based on the operational environment information. For example, the operational environment information may indicate an area type, such as urban or rural, a time of day, an ambient light level, weather conditions, traffic conditions, which may include expected traffic conditions, such as rush hour conditions, event-related traffic congestion, or holiday related driver behavior conditions, road conditions, jurisdictional conditions, such as country, state, or municipality conditions, or any other condition or combination of conditions that may affect the operation of the autonomous vehicle.

In some embodiments, such as embodiments implementing a POMDP model, modeling an autonomous vehicle operational control scenario may include modeling occlusions. For example, the operational environment information may include information corresponding to one or more occlusions, such as sensor occlusions, in the operational environment of the autonomous vehicle such that the operational environment information may omit information representing one or more occluded external objects in the operational environment of the autonomous vehicle. For example, an occlusion may be an external object, such as a traffic signs, a building, a tree, an identified external object, or any other operational condition or combination of operational conditions capable of occluding one or more other operational conditions, such as external objects, from the autonomous vehicle at a defined spatiotemporal location. An operational environment monitor 4300 may identify occlusions, may identify or determine a probability that an external object is occluded, or hidden, by an identified occlusion, and may include occluded vehicle probability information in the operational environment information output to the autonomous vehicle operational management controller 4100, and communicated, by the autonomous vehicle operational management controller 4100, to the respective scenario-specific operational control evaluation modules 4400.

One or more of the SSOCEMs 4400 may be a Decentralized Partially Observable Markov Decision Process (Dec-POMDP) model, which may be a multi-agent model, and which may model a distinct vehicle operational scenario. A Dec-POMDP model may be similar to a POMDP model except that a POMDP model may model the autonomous vehicle and a subset, such as one, of external objects and a Dec-POMDP model may model the autonomous vehicle and the set of external objects.

One or more of the SSOCEMs 4400 may be a Partially Observable Stochastic Game (POSG) model, which may be a multi-agent model, and which may model a distinct vehicle operational scenario. A POSG model may be similar to a Dec-POMDP except that the Dec-POMDP model may include a reward function for the autonomous vehicle and the POSG model may include the reward function for the autonomous vehicle and a respective reward function for each external object.

One or more of the SSOCEMs 4400 may be a learning model, for example a Reinforcement Learning (RL) model, and which may model a distinct vehicle operational scenario. An RL model may be similar to an MDP model or a POMDP model except that defined state transition probabilities, observation probabilities, reward function, or any combination thereof, may be omitted from the model.

An RL model may be a model-based RL model, which may include generating state transition probabilities, observation probabilities, a reward function, or any combination thereof based on one or more modeled or observed events. In an RL model, the model may evaluate one or more events or interactions, which may be simulated events, such as traversing an intersection, traversing a vehicle transportation network near a pedestrian, or changing lanes, and may generate, or modify, a corresponding model, or a solution thereof, in response to the respective event. For example, the autonomous vehicle may traverse an intersection using an RL model. The RL model may indicate a candidate vehicle control action for traversing the intersection. The autonomous vehicle may traverse the intersection using the candidate vehicle control action as the vehicle control action for a temporal location. The autonomous vehicle may determine a result of traversing the intersection using the candidate vehicle control action, and may update the model based on the result.

In an example, at a first temporal location a remote vehicle may be stationary at an intersection with a prohibited right-of-way indication, such as a red light, the RL model may indicate a 'proceed' candidate vehicle control action for the first temporal location, the RL model may include a probability of identifying operational environment information at a subsequent temporal location, subsequent to traversing the vehicle transportation network in accordance with the identified candidate vehicle control action, indicating that a geospatial location of the remote vehicle corresponding to the first temporal location differs from a geospatial location of the remote vehicle corresponding to the second temporal location is low, such as 0/100. The autonomous vehicle may traverse the vehicle transportation network in accordance with the identified candidate vehicle control action, may subsequently determine that the geospatial location of the remote vehicle corresponding to the first temporal location differs from the geospatial location of the remote vehicle corresponding to the second temporal location, and may modify, or update, the probability accordingly incorporate the identified event, such as to 1/101.

In another example, the RL model may indicate a defined positive expected reward for traversing the vehicle transportation network from a first temporal location to a second temporal location in accordance with an identified vehicle control action and in accordance with identified operational environment information, which may be probabilistic. The autonomous vehicle may traverse the vehicle transportation network in accordance with the identified vehicle control action. The autonomous vehicle may determine, based on subsequently identified operational environment information, which may be probabilistic, that the operational environment information corresponding to the second temporal location is substantially similar to the operational environment information identified corresponding to the first temporal location, which may indicate a cost, such as in time, of traversing the vehicle transportation network in accordance with the identified vehicle control action, and the Reinforcement Learning model may reduce the corresponding expected reward.

The autonomous vehicle operational management system 4000 may include any number or combination of types of models. For example, the pedestrian-scenario-specific operational control evaluation module 4410, the intersection-scenario-specific operational control evaluation module 4420, and the lane change-scenario-specific operational control evaluation module 4430 may be POMDP models. In another example, the pedestrian-scenario-specific operational control evaluation module 4410 may be a MDP model and the intersection-scenario-specific operational control evaluation module 4420 and the lane change-scenario-specific operational control evaluation module 4430 may be POMDP models.

The autonomous vehicle operational management controller 4100 may instantiate any number of instances of the scenario-specific operational control evaluation modules 4400 based on the operational environment information. For example, the operational environment information may include information representing a pedestrian approaching an intersection along an expected path for the autonomous vehicle, and the autonomous vehicle operational management controller 4100 may identify a pedestrian vehicle operational scenario, an intersection vehicle operational scenario, or both. The autonomous vehicle operational management controller 4100 may instantiate an instance of the pedestrian-scenario-specific operational control evaluation module 4410, an instance of the intersection-scenario-specific operation control evaluation module 4420, or both.

In another example, the operational environment information may include information representing more than one pedestrians at or near an intersection along an expected path for the autonomous vehicle. The autonomous vehicle operational management controller 4100 may identify pedestrian operational scenarios corresponding to the one or more pedestrians, an intersection vehicle operational scenario, or a combination thereof. The autonomous vehicle operational management controller 4100 may instantiate instances of the pedestrian-scenario-specific operational control evaluation module 4410 for some or all of the pedestrian operational scenarios, an instance of the intersection-scenario-specific operation control evaluation module 4420, or a combination thereof.

The pedestrian-scenario-specific operational control evaluation module 4410 may be a model of an autonomous vehicle operational control scenario that includes the autonomous vehicle traversing a portion of the vehicle transportation network proximate to a pedestrian (pedestrian scenario). The pedestrian-scenario-specific operation control evaluation module 4410 may receive operational environment information, such as the pedestrian information generated by the pedestrian operational environment monitor 4310, from the autonomous vehicle operational management controller 4100.

The pedestrian-scenario-specific operational control evaluation module 4410 may model pedestrian behavior corresponding to the pedestrian traversing a portion of the vehicle transportation network or otherwise probabilistically affecting the operation of the autonomous vehicle. The pedestrian-scenario-specific operational control evaluation module 4410 may model a pedestrian as acting in accordance with pedestrian model rules expressing probable pedestrian behavior. For example, the pedestrian model rules may express vehicle transportation network regulations, pedestrian transportation network regulations, predicted pedestrian behavior, societal norms, or a combination thereof. For example, the pedestrian model rules may indicate a probability that a pedestrian may traverse a portion of the vehicle transportation network via a crosswalk or other defined pedestrian access area. The pedestrian-scenario-specific operational control evaluation module 4410 may model a pedestrian as acting independently of defined vehicle transportation network regulations, pedestrian transportation network regulations, or both, such as by jaywalking.

The pedestrian-scenario-specific operational control evaluation module 4410 may output a candidate vehicle control action, such as a 'stop' candidate vehicle control action, an 'advance' candidate vehicle control action, or a 'proceed' candidate vehicle control action. The candidate vehicle control action may be a compound vehicle control action. For example, the candidate vehicle control action may include an 'advance' vehicle control action, which may be an indirect signaling pedestrian communication vehicle control action, and may include a direct signaling pedestrian communication vehicle control action, such as flashing headlights of the autonomous vehicle or sounding a horn of the autonomous vehicle.

The intersection-scenario-specific operational control evaluation module 4420 may be a model of an autonomous vehicle operational control scenario that includes the autonomous vehicle traversing a portion of the vehicle transportation network that includes an intersection. The intersection-scenario-specific operational control evaluation module 4420 may model the behavior of remote vehicles traversing an intersection in the vehicle transportation network or otherwise probabilistically affecting the operation of the autonomous vehicle traversing the intersection. An intersection may include any portion of the vehicle transportation network wherein a vehicle may transfer from one road to another.

Modeling an autonomous vehicle operational control scenario may include the autonomous vehicle traversing a portion of the vehicle transportation network that includes an intersection may include determining a right-of-way order for vehicles to traverse the intersection, such as by negotiating with remote vehicles. Modeling an autonomous vehicle operational control scenario may include the autonomous vehicle traversing a portion of the vehicle transportation network that includes an intersection may include modeling one or more traffic controls, such as a stop sign, a yield sign, a traffic light, or any other traffic control device, regulation, signal, or combination thereof. Modeling an autonomous vehicle operational control scenario may include the autonomous vehicle traversing a portion of the vehicle transportation network that includes an intersection may include outputting an 'advance' candidate vehicle control action, receiving information, such as sensor information, in response to the autonomous vehicle performing the 'advance' candidate vehicle control action, and outputting a subsequent candidate vehicle control action based on the received information. Modeling an autonomous vehicle operational control scenario may include the autonomous vehicle traversing a portion of the vehicle transportation network that includes an intersection may include modeling a probability that a remote vehicle may traverse the intersection in accordance with vehicle transportation network regulations. Modeling an autonomous vehicle operational control scenario may include the autonomous vehicle traversing a portion of the vehicle transportation network that includes an intersection may include modeling a probability that a remote vehicle may traverse the intersection independent of one or more vehicle transportation network regulations, such as by following closely behind or piggybacking another remote vehicle having a right-of-way.

The intersection-scenario-specific operational control evaluation module 4420 may output a candidate vehicle control action, such as a 'stop' candidate vehicle control action, an 'advance' candidate vehicle control action, or a 'proceed' candidate vehicle control action. The candidate vehicle control action may be a compound vehicle control action. For example, the candidate vehicle control action may include a 'proceed' vehicle control action and a signaling communication vehicle control action, such as flashing a turn signal of the autonomous vehicle.

The lane change-scenario-specific operational control evaluation module 4430 may be a model of an autonomous vehicle operational control scenario that includes the autonomous vehicle traversing a portion of the vehicle transportation network by performing a lane change operation. The lane change-scenario-specific operational control evaluation module 4430 may model the behavior of remote vehicles probabilistically affecting the operation of the autonomous vehicle traversing the lane change.

Modeling an autonomous vehicle operational control scenario may include the autonomous vehicle traversing a portion of the vehicle transportation network by performing a lane change may include outputting 'maintain' candidate vehicle control action, a 'proceed' vehicle control action, an 'accelerate' vehicle control action, a 'decelerate' vehicle control action, or a combination thereof.

One or more of the autonomous vehicle operational management controller 4100, the learning monitor 4200, the operational environment monitors 4300, or the SSOCEMs 4400, may operate continuously or periodically, such as at a frequency of ten hertz (10 Hz). For example, the autonomous vehicle operational management controller 4100 may identify a vehicle control action many times, such as ten times, per second. The operational frequency of each component of the autonomous vehicle operational management system 4000 may be synchronized or unsynchronized, and the operational rate of one or more of the autonomous vehicle operational management controller 4100, the learning monitor 4200, the operational environment monitors 4300, or the SSOCEMs 4400 may be independent of the operational rate of another one or more of the autonomous vehicle operational management controller 4100, the learning monitor 4200, the operational environment monitors 4300, or the SSOCEMs 4400.

The candidate vehicle control actions output by the instances of the SSOCEMs 4400 may include, or be associated with, operational environment information, such as state information, temporal information, or both. For example, a candidate vehicle control action may be associated with operational environment information representing a possible future state, a future temporal location, or both. The autonomous vehicle operational management controller 4100 may identify stale candidate vehicle control actions representing past temporal locations, states having a probability of occurrence below a minimum threshold, or unelected candidate vehicle control actions, and may delete, omit, or ignore the stale candidate vehicle control actions.

Figure 5:
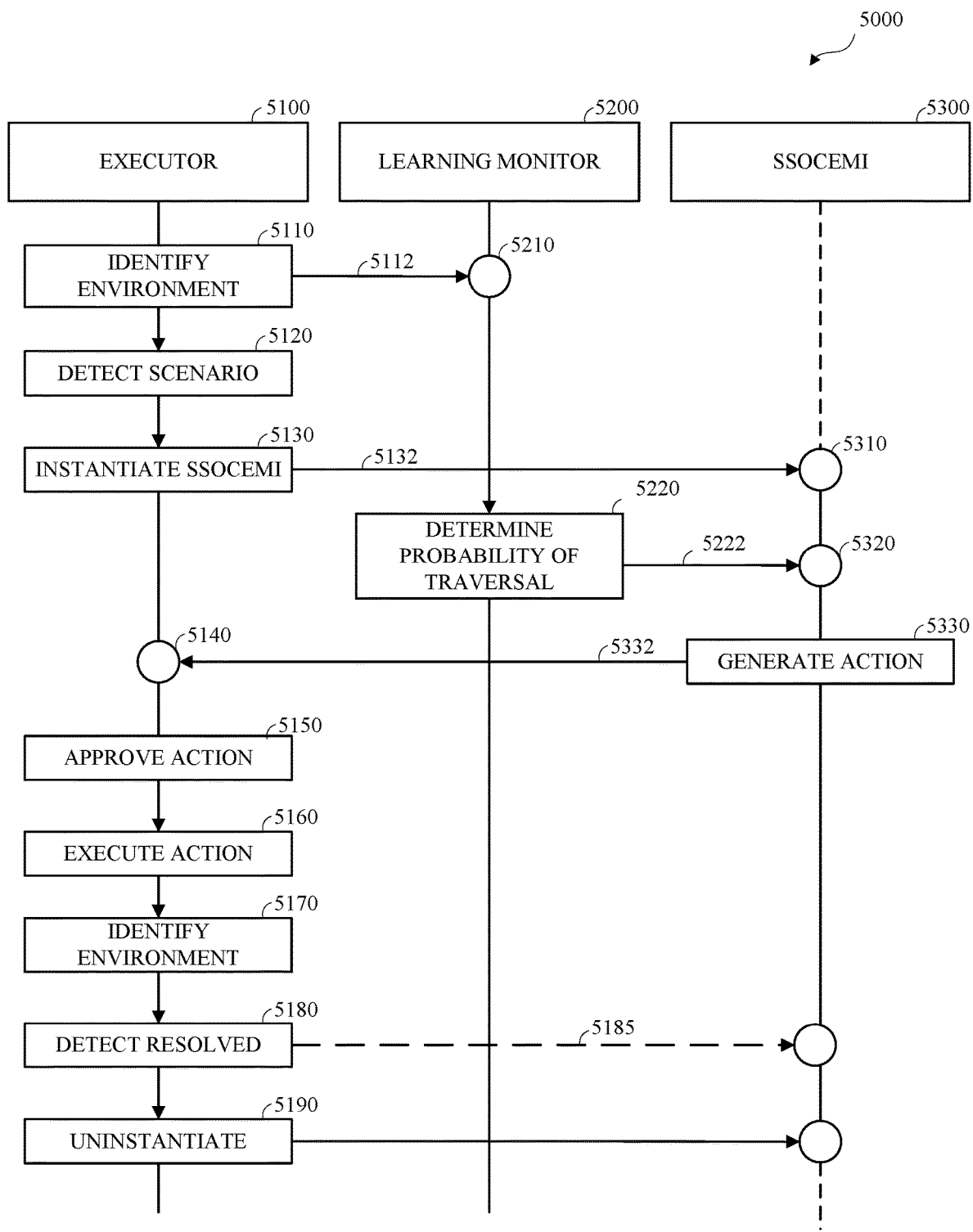
FIG. 5 is a flow diagram of an example autonomous vehicle operational management system configured for learning constraints in accordance with embodiments of this disclosure.

FIG. 5 is a flow diagram of an example of an autonomous vehicle operational management 5000 configured for learning in accordance with embodiments of this disclosure. Autonomous vehicle operational management 5000 may be implemented in an autonomous vehicle, such as the vehicle 1000 shown in FIG. 1, one of the vehicles 2100/2110 shown in FIG. 2, a semi-autonomous vehicle, or any other vehicle implementing autonomous driving. For example, an autonomous vehicle may implement an autonomous vehicle operational management system, such as the autonomous vehicle operational management system 4000 shown in FIG. 4.

Autonomous vehicle operational management 5000 may include implementing or operating one or more modules or components, which may include operating an autonomous vehicle operational management controller or executor 5100, such as the autonomous vehicle operational management controller 4100 shown in FIG. 4; a learning monitor 5200, such as the learning monitor, 4200 shown in FIG. 4; zero or more scenario-specific operational control evaluation module instances (SSOCEMI) 5300, such as instances of the SSOCEMs 4400 shown in FIG. 4; or a combination thereof.

Although not shown separately in FIG. 5, the executor 5100 may monitor the operational environment of the autonomous vehicle, or defined aspects thereof. Monitoring the operational environment of the autonomous vehicle may include identifying and tracking external objects at 5110, identifying distinct vehicle operational scenarios at 5120, or a combination thereof.

The executor 5100 may identify an operational environment, or an aspect thereof, of the autonomous vehicle at 5110. Identifying the operational environment may include identifying operational environment information representing the operational environment, or one or more aspects thereof. The operational environment information may include vehicle information for the autonomous vehicle, information representing the vehicle transportation network, or one or more aspects thereof, proximate to the autonomous vehicle, information representing external objects, or one or more aspects thereof, within the operational environment of the autonomous vehicle, or a combination thereof.

The executor 5100 may identify the operational environment information at 5110 based on sensor information, vehicle transportation network information, previously identified operational environment information, or any other information or combination of information describing an aspect or aspects of the operational environment (e.g., a current state of the vehicle). The sensor information may be processed sensor information, such as processed sensor information from a sensor information processing unit of the autonomous vehicle, which may receive sensor information from the sensor of the autonomous vehicle and may generate the processed sensor information based on the sensor information.

Identifying the operational environment information at 5110 may include receiving information indicating one or more aspects of the operational environment from a sensor of the autonomous vehicle, such as the sensor 1360 shown in FIG. 1 or the on-vehicle sensors 2105 shown in FIG. 2. For example, the sensor may detect an external object, such as a pedestrian, a vehicle, or any other object, external to the autonomous vehicle, within a defined distance, such as 300 meters, of the autonomous vehicle, and the sensor may send sensor information indicating or representing the external object to the executor 5100. The sensor, or another unit of the autonomous vehicle, may store the sensor information in a memory, such as the memory 1340 shown in FIG. 1, of the autonomous vehicle and the autonomous vehicle operational management controller 5100 reading the sensor information from the memory.

The external object indicated by the sensor information may be indeterminate, and the autonomous vehicle operational management controller 5100 may identify object information, such as an object type, based on the sensor information, other information, such as information from another sensor, information corresponding to a previously identified object, or a combination thereof. The sensor, or another unit of the autonomous vehicle may identify the object information and may send the object identification information to the autonomous vehicle operational management controller 5100.

The sensor information may indicate a road condition, a road feature, or a combination thereof. For example, the sensor information may indicate a road condition, such as a wet road condition, an icy road condition, or any other road condition or conditions. In another example, the sensor information may indicate road markings, such as a lane line, an aspect of roadway geometry, or any other road feature or features.

Identifying the operational environment information at 5110 may include identifying information indicating one or more aspects of the operational environment from vehicle transportation network information. For example, the autonomous vehicle operational management controller 5100 may read, or otherwise receive, vehicle transportation network information indicating that the autonomous vehicle is approaching an intersection, or otherwise describing a geometry or configuration of the vehicle transportation network proximate to the autonomous vehicle, such as within 300 meters of the autonomous vehicle.

Identifying the operational environment information at 5110 may include identifying information indicating one or more aspects of the operational environment from a remote vehicle or other remote device external to the autonomous vehicle. For example, the autonomous vehicle may receive, from a remote vehicle, via a wireless electronic communication link, a remote vehicle message including remote vehicle information indicating remote vehicle geospatial state information for the remote vehicle, remote vehicle kinematic state information for the remote vehicle, or both.

The executor 5100 may include one or more scenario-specific monitor module instances. For example, the executor 5100 may include a scenario-specific monitor module instance for monitoring pedestrians, a scenario-specific monitor module instance for monitoring intersections, a scenario-specific monitor module instance for monitoring lane changes, or a combination thereof. Each scenario-specific monitor module instance may receive, or otherwise access, operational environment information corresponding to the respective scenario, and may send, store, or otherwise output to, or for access by, the executor 5100, the learning monitor 5200, the SSOCEMI 5300, or a combination thereof specialized monitor information corresponding to the respective scenario.

The executor 5100 may send the operational environment information representing an operational environment for the autonomous vehicle to the learning monitor 5200 at 5112. Alternatively, or in addition, the learning monitor 5200 may receive the operational environment information representing an operational environment for the autonomous vehicle from another component of the autonomous vehicle, such as from a sensor of the autonomous vehicle, the learning monitor 5200 may read the operational environment information representing an operational environment for the autonomous vehicle from a memory of the autonomous vehicle, or a combination thereof.

The executor 5100 may detect or identify one or more distinct vehicle operational scenarios at 5120. The executor 5100 may detect distinct vehicle operational scenarios at 5120 based on one or more aspects of the operational environment represented by the operational environment information identified at 5110.

The executor 5100 may identify multiple distinct vehicle operational scenarios, which may be aspects of a compound vehicle operational scenario, at 5120. For example, the operational environment information may include information representing a pedestrian approaching an intersection along an expected path for the autonomous vehicle, and the executor 5100 may identify a pedestrian vehicle operational scenario, an intersection vehicle operational scenario, or both at 5120. In another example, the operational environment represented by the operational environment information may include multiple external objects and the executor 5100 may identify a distinct vehicle operational scenario corresponding to each external object at 5120.

The executor 5100 may instantiate a SSOCEMI 5300 based on one or more aspects of the operational environment represented by the operational environment information at 5130 and/or demonstration data obtained from a user. For example, the executor 5100 may instantiate the SSOCEMI 5300 at 5130 in response to identifying a distinct vehicle operational scenario at 5120.

Although one SSOCEMI 5300 is shown in FIG. 5, the executor 5100 may instantiate multiple SSOCEMIs 5300 based on one or more aspects of the operational environment represented by the operational environment information identified at 5110, each SSOCEMI 5300 corresponding to a respective distinct vehicle operational scenario detected at 5120, or a combination of a distinct external object identified at 5110 and a respective distinct vehicle operational scenario detected at 5120.

For example, the operational environment represented by the operational environment information identified at 5110 may include multiple external objects, the executor 5100 may detect multiple distinct vehicle operational scenarios, which may be aspects of a compound vehicle operational scenario, at 5120 based on the operational environment represented by the operational environment information identified at 5110, and the executor 5100 may instantiate a SSOCEMI 5300 corresponding to each distinct combination of a distinct vehicle operational scenario and an external object.

A scenario-specific operational control evaluation module corresponding to the distinct vehicle operational scenario identified at 5120 may be unavailable and instantiating a SSOCEMI 5300 at 5130 may include generating, solving, and instantiating an instance 5300 of a scenario-specific operational control evaluation module corresponding to the distinct vehicle operational scenario identified at 5120 to determine a belief path. For example, the distinct vehicle operational scenario identified at 5120 may indicate an intersection including two lanes having stop traffic control signals, such as stop signs, and two lanes having yield traffic control signals, such as yield signs, the available SSOCEMs may include a POMDP scenario-specific operational control evaluation module that differs from the distinct vehicle operational scenario identified at 5120, such as a POMDP scenario-specific operational control evaluation module that models an intersection scenario including four lanes having stop traffic control signals, and the executor 5100 may generate, solve, and instantiate an instance 5300 of an MDP scenario-specific operational control evaluation module modeling an intersection including two lanes having stop traffic control signals and two lanes having yield traffic control signals at 5130.

Instantiating a SSOCEMI at 5130 may include identifying a convergence probability of spatio-temporal convergence based on information about the autonomous vehicle, the operational environment information, or a combination thereof. The convergence probability may be expressed as a belief simplex, which is further described in FIG. 7. Identifying a convergence probability of spatio-temporal convergence may include identifying an expected path for the autonomous vehicle, identifying an expected path for the remote vehicle, and identifying a probability of convergence for the autonomous vehicle and the remote vehicle indicating a probability that the autonomous vehicle and the remote vehicle may converge or collide based on the expected path information. The SSOCEMI may be instantiated in response to determining that the convergence probability exceeds a defined threshold, such as a defined maximum acceptable convergence probability.

Instantiating a SSOCEMI 5300 at 5130 may include sending the operational environment information representing an operational environment for the autonomous vehicle to the SSOCEMIs 5300 as indicated at 5132.

The SSOCEMI 5300 may receive the operational environment information representing an operational environment for the autonomous vehicle, or one or more aspects thereof, at 5310. For example, the SSOCEMI 5300 may receive the operational environment information representing an operational environment for the autonomous vehicle, or one or more aspects thereof, sent by the executor 5100 at 5132. Alternatively, or in addition, the SSOCEMIs 5300 may receive the operational environment information representing an operational environment for the autonomous vehicle from another component of the autonomous vehicle, such as from a sensor of the autonomous vehicle or from the learning monitor 5200, the SSOCEMIs 5300 may read the operational environment information representing an operational environment for the autonomous vehicle from a memory of the autonomous vehicle, or a combination thereof.

The learning monitor 5200 may receive the operational environment information representing an operational environment, or an aspect thereof, for the autonomous vehicle at 5210. For example, the learning monitor 5200 may receive the operational environment information, or an aspect thereof, sent by the executor 5100 at 5112. The learning monitor 5200 may receive the operational environment information, or an aspect thereof, from a sensor of the autonomous vehicle, from an external device, such as a remote vehicle or an infrastructure device, or a combination thereof. The learning monitor 5200 may read the operational environment information, or an aspect thereof, from a memory, such as a memory of the autonomous vehicle.

The learning monitor 5200 may determine a respective probability of traversal at 5220 for one or more portions of the vehicle transportation network, such as portions of the vehicle transportation network proximal to the autonomous vehicle, which may include portions of the vehicle transportation network corresponding to an expected path of the autonomous vehicle, such as an expected path identified based on a current route of the autonomous vehicle.

Determining the respective probability of traversal at 5220 may include identifying external objects, tracking external objects, projecting location information for external objects, projecting path information for external objects, or a combination thereof. For example, the learning monitor 5200 may identify an external object and may identify an expected path for the external object, which may indicate a sequence of expected spatial locations, expected temporal locations, and corresponding probabilities.

The learning monitor 5200 may identify the expected path for an external object based on operational environment information, such as information indicating a current location of the external object, information indicating a current trajectory for the external object, information indicating a type of classification of the external object, such as information classifying the external object as a pedestrian or a remote vehicle, vehicle transportation network information, such as information indicating that the vehicle transportation network includes a crosswalk proximate to the external object, operational environment history such as previously identified or tracked information associated with the external object, driver-initiated vehicle control action, or any combination thereof. For example, the external object may be identified as a remote vehicle, and the expected path for the remote vehicle may be identified based on information indicating a current location of the remote vehicle, information indicating a current trajectory of the remote vehicle, information indicating a current speed of the remote vehicle, vehicle transportation network information corresponding to the remote vehicle, legal or regulatory information, or a combination thereof.

The learning monitor 5200 may send the probabilities of traversal identified at 5220 to the SSOCEMIs 5300 at 5222. Alternatively, or in addition, the learning monitor 5200 may store the probabilities of traversal identified at 5220 in a memory of the autonomous vehicle, or a combination thereof. Although not expressly shown in FIG. 5, the learning monitor 5200 may send the probabilities of traversal identified at 5220 to the executor 5100 at 5212 in addition to, or in alternative to, sending the probabilities of traversal to the SSOCEMIs 5300. The learning monitor 5200 may learn constraints by sampling a constraint and determining counter-factual belief path labels to increase an expectation value of the user demonstration data. The learning monitor 5200 may select a subset of the determined counter-factual belief path labels and determine a candidate constraint based on the subset of the determined counter-factual belief path labels. This process is repeated to obtain learned constraints. The probabilities of traversal sent at 5222 include the learned constraints.

The SSOCEMI 5300 may receive the probabilities of traversal at 5320. For example, the SSOCEMI 5300 may receive the probabilities of traversal sent by the learning monitor 5200 at 5222. The SSOCEMI 5300 may read the probabilities of traversal from a memory, such as a memory of the autonomous vehicle.

The SSOCEMI 5300 may solve a model of the corresponding distinct vehicle operational scenario at 5330. In some embodiments, the SSOCEMI 5300 may generate or identify a candidate vehicle control action at 5330.

The SSOCEMI 5300 may send the candidate vehicle control action identified at 5330 to the executor 5100 at 5332. Alternatively, or in addition, the SSOCEMI 5300 may store the candidate vehicle control action identified at 5330 in a memory of the autonomous vehicle.

The executor 5100 may receive a candidate vehicle control action at 5140. For example, the executor 5100 may receive the candidate vehicle control action from SSOCEMI 5300 at 5140. Alternatively, or in addition, the executor 5100 may read the candidate vehicle control action from a memory of the autonomous vehicle.

The executor 5100 may approve the candidate vehicle control action, or otherwise identify the candidate vehicle control action as a vehicle control action for controlling the autonomous vehicle to traverse the vehicle transportation network, at 5150. For example, the executor 5100 may identify one distinct vehicle operational scenario at 5120, instantiate one SSOCEMI 5300 at 5130, receive one candidate vehicle control action at 5140, and may approve the candidate vehicle control action at 5150.

The executor 5100 may identify multiple distinct vehicle operational scenarios at 5120, instantiate multiple SSOCEMIs 5300 at 5130, receive multiple candidate vehicle control actions at 5140, and may approve one or more of the candidate vehicle control actions at 5150. In addition, or in the alternative, autonomous vehicle operational management 5000 may include operating one or more previously instantiated SSOCEMIs (not expressly shown), and the executor may receive candidate vehicle control actions at 5140 from the scenario-specific operational control evaluation module instance instantiated at 5130 and from one or more of the previously instantiated scenario-specific operational control evaluation module instances, and may approve one or more of the candidate vehicle control actions at 5150.

Approving a candidate vehicle control action at 5150 may include determining whether to traverse a portion of the vehicle transportation network in accordance with the candidate vehicle control action.

The executor 5100 may control the autonomous vehicle to traverse the vehicle transportation network, or a portion thereof, at 5160 in accordance with the vehicle control action identified at 5150.

The executor 5100 may identify an operational environment, or an aspect thereof, of the autonomous vehicle at 5170. Identifying an operational environment, or an aspect thereof, of the autonomous vehicle at 5170 may be similar to identifying the operational environment of the autonomous vehicle at 5110 and may include updating previously identified operational environment information.

The executor 5100 may determine or detect whether a distinct vehicle operational scenario is resolved or unresolved at 5180. For example, the executor 5100 may receive operation environment information continuously or on a periodic basis, as described above. The executor 5100 may evaluate the operational environment information to determine whether the distinct vehicle operational scenario has resolved.

The executor 5100 may determine that the distinct vehicle operational scenario corresponding to the SSOCEMI 5300 is unresolved at 5180, the executor 5100 may send the operational environment information identified at 5170 to the SSOCEMI 5300 as indicated at 5185, and uninstantiating the SSOCEMI 5300 at 5180 may be omitted or differed.

The executor 5100 may determine that the distinct vehicle operational scenario is resolved at 5180 and may uninstantiate at 5190 the SSOCEMIs 5300 corresponding to the distinct vehicle operational scenario determined to be resolved at 5180. For example, the executor 5100 may identify a distinct set of operative conditions forming the distinct vehicle operational scenario for the autonomous vehicle at 5120, may determine that one or more of the operative conditions has expired, or has a probability of affecting the operation of the autonomous vehicle below a defined threshold at 5180, and may uninstantiate the corresponding SSOCEMI 5300.

Although not expressly shown in FIG. 5, the executor 5100 may continuously or periodically repeat identifying or updating the operational environment information at 5170, determining whether the distinct vehicle operational scenario is resolved at 5180, and, in response to determining that the distinct vehicle operational scenario is unresolved at 5180, sending the operational environment information identified at 5170 to the SSOCEMI 5300 as indicated at 5185, until determining whether the distinct vehicle operational scenario is resolved at 5180 includes determining that the distinct vehicle operational scenario is resolved.

Figure 6:
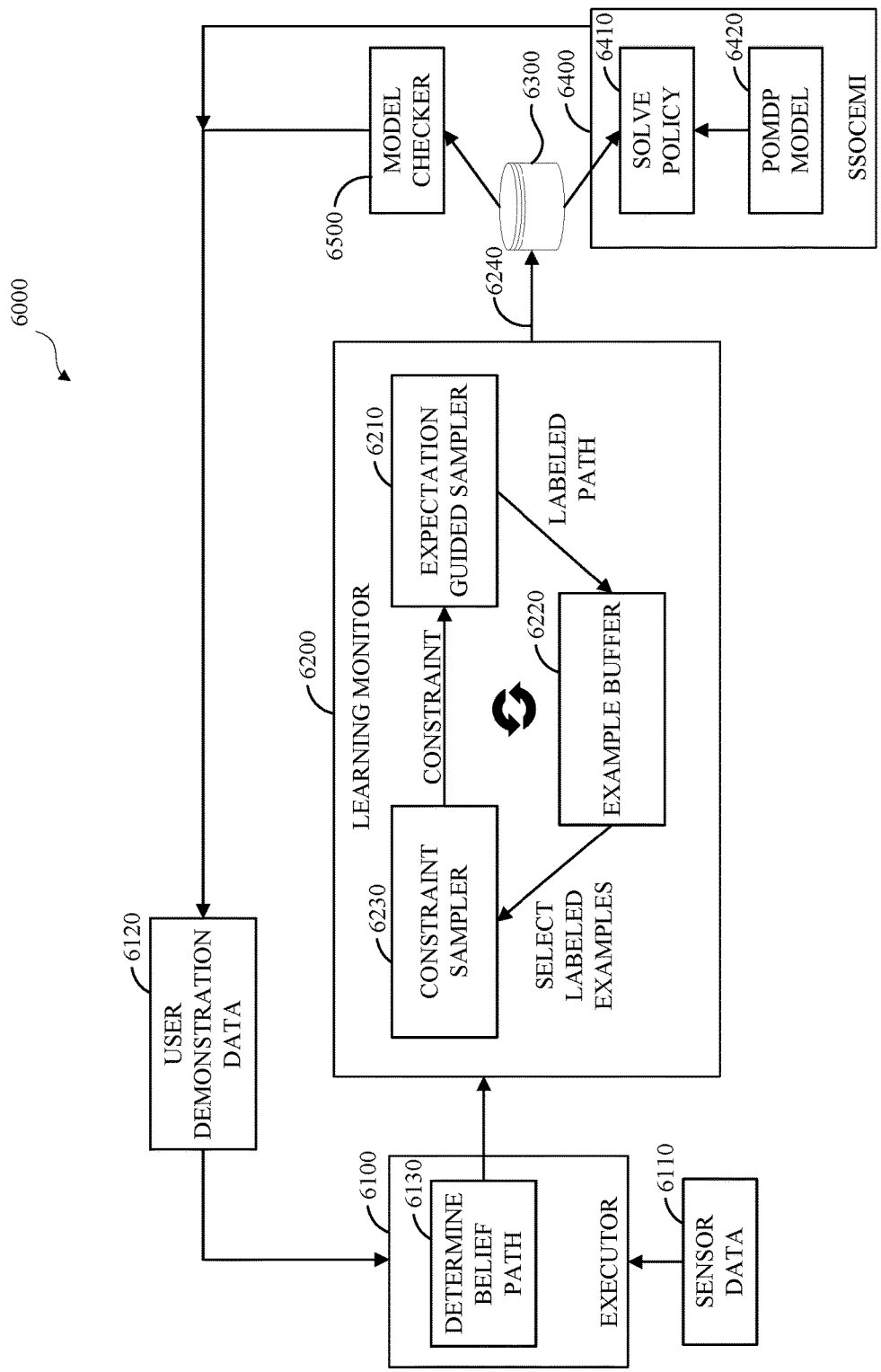
FIG. 6 is a diagram of an example of a vehicle operational management system configured for learning constraints based on beliefs.

FIG. 6 is a diagram of an example of a vehicle operational management system 6000 configured for learning constraints based on beliefs. The vehicle operational management system 6000 includes an executor 6100, a learning monitor 6200, a database 6300, and a SSOCEMI 6400. The executor 6100 may be the executor 5100 shown in FIG. 5. The learning monitor 6200 may be the learning monitor 5200 shown in FIG. 5. The SSOCEMI 6400 may be the SSOCEMI 5300 shown in FIG. 5.

As shown in FIG. 6, the executor 6100 is configured to obtain sensor data from one or more sensors (not shown). The sensor data may include perception and localization data obtained from one or more sensors such as a camera, a light detection and ranging (LIDAR) sensor, a radar sensor, or a GPS. The perception and localization data may be used to determine a current world state in relation to the autonomous vehicle. The executor 6100 is configured to obtain user demonstration data 6120. The user demonstration data 6120 may be obtained from one or more sensors. In some implementations, the user demonstration data may be obtained from a database (not shown). User demonstration data is data associated with a sequence of actions performed by a driver of the autonomous vehicle and probability distributions of a current state of the autonomous vehicle and may be obtained using one or more sensors of the autonomous vehicle. The executor 6100 is configured to determine a belief path 6130 based on the sensor data 6110 and the user demonstration data 6120. The executor 6100 may be configured to use a POMDP model to determine the belief path 6130. The executor 6100 is configured to send the belief path 6130 to the learning monitor 6200.

The learning monitor 6200 includes an expectation guided sampler 6210, an example buffer 6220, and a constraint sampler 6230. The expectation guided sampler 6210 is configured to obtain the belief path 6130. The expectation guided sampler 6210 is configured to determine counter-factual belief path labels based on the belief path 6130. The counter-factual belief path labels are determined to increase an expectation value of the user demonstration data. For example, the counter-factual belief path labels may be used to determine a constraint that explains when a driver's behavior is unexpected given optimal behavior. The example buffer 6220 is configured to obtain the counter-factual belief path labels from the expectation guided sampler 6210. The constraint sampler 6230 is configured to select a subset of the counter-factual belief path labels from the example buffer 6220 and determine a candidate constraint based on the subset of the counter-factual belief path labels. The constraint sampler 6230 is configured to send the candidate constraint to the expectation guided sampler 6210 and the process is repeated to refine the candidate constraints. The learning monitor 6200 is configured to output the candidate constraints as learned constraints 6240. The learned constraints 6240 may be stored in a database 6300.

The SSOCEMI 6400 is configured to obtain the learned constraints 6240 from the database 6300. The SSOCEMI 6400 is configured to solve a policy 6410 using a POMDP model 6420 and applying the learned constraints 6240 to the POMDP model 6420. Solving the policy 6410 includes determining a candidate vehicle control action that solves the POMDP model 6420. The candidate vehicle control action is performed and the process is repeated.

A model checker 6500 may be configured to perform an automated formal analysis. The model checker 6500 may be a formal probabilistic model checker, such as a STORM model checker. The model checker 6500 is configured to learn a belief constraint or obtain the learned constraints 6240 from the database 6300. The model checker 6500 is configured to optimize a policy given that constraint. The model checker 6500 may verify whether or not the constraint is valid based on one or more environmental assumptions. In some examples, the model checker 6500 may use a counter example guided loop to learn a set of assumptions such that the policy is valid.

In an example, the learning monitor 6200 may start with a trivial constraint that never disables an action. The learning monitory 6200 may then determine that the go action not being applied to enter an intersection is an unexpected outcome. If the corresponding belief state had a large uncertainty in the confidence that no other vehicle would enter the intersections, the learning monitor 6200 would then attempt to find a constraint that disables the go action at this belief state.

Figure 7:
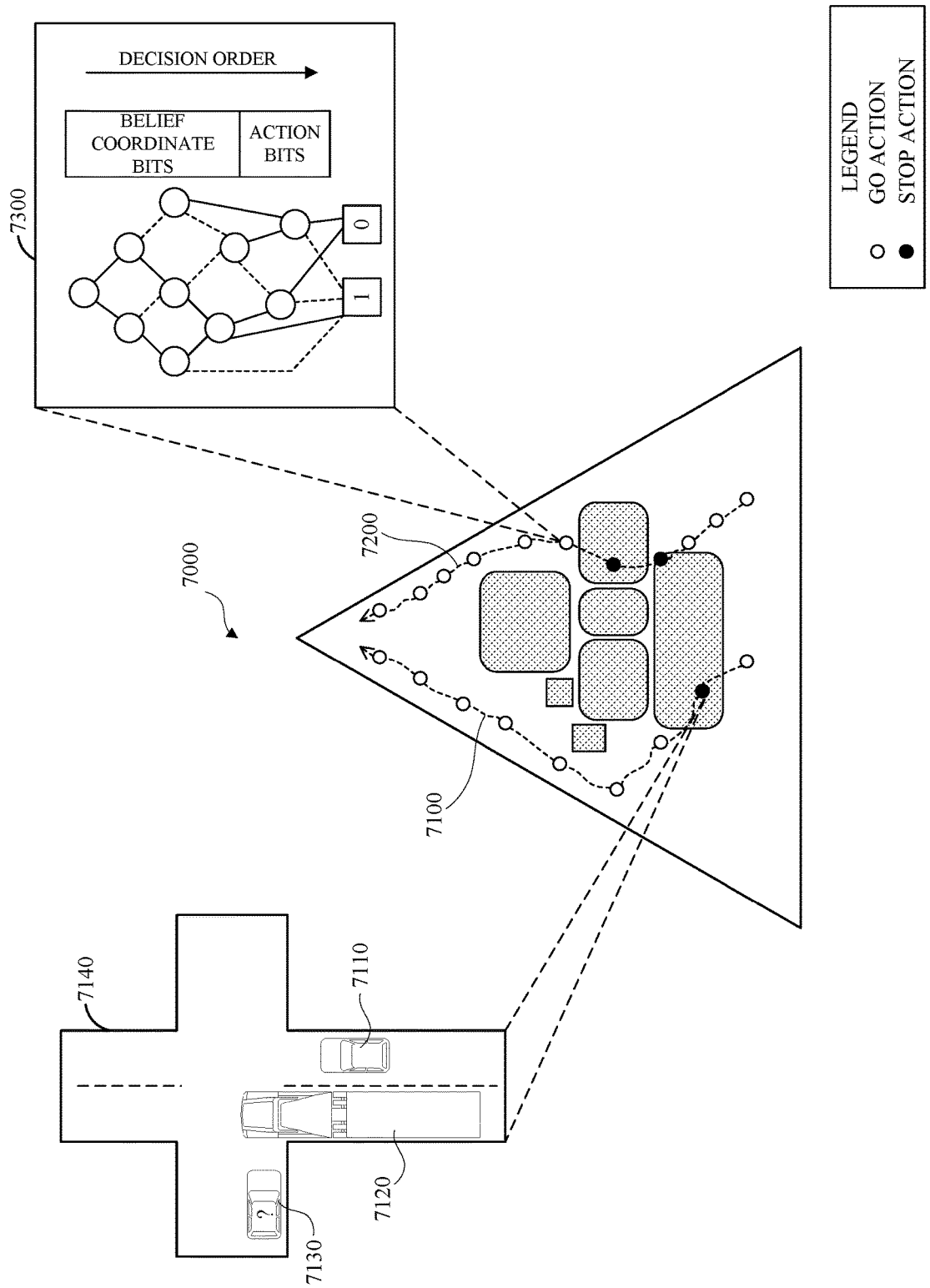
FIG. 7 is a diagram of an example of a belief simplex.

FIG. 7 is a diagram of an example of a belief simplex 7000. User demonstrations become paths through the belief simplex 7000, where the belief simplex 7000 is a geometric representation of possible probability distributions over a finite set of outcomes. The constraints are then Boolean predicates over the subsets of the belief simplex 7000 and the current action. If the predicate is determined to be true for a given belief and action pair, then the action is disallowed at that belief state (e.g., a point in the belief simplex 7000).

In this example, paths 7100 and 7200 are shown in dashed lines. Two paths are shown in this example for simplicity and clarity, and it is understood that the belief simplex can include any number of paths. The paths 7100 and 7200 include circles that indicate an action taken. The black circles indicate a stop action and the white circles indicate a go action. The regions shown in stippling within the belief simplex 7000 indicate a conjectured belief constraint that disables the go action. The go action may be disabled when the autonomous vehicle 7110 determines that an uncertainty value is above a threshold, such as when a truck 7120 blocks the view of oncoming traffic 7130 at an intersection 7140, for example. The paths 7100 and 7200 are demonstrations that the user provides that conform to an unknown constraint (e.g., a region shown in stippling).

The belief simplex 7000 includes a hypothesized constraint 7300. The hypothesized constraint is shown in a form of a reduced ordered binary decision diagram. The structure describes which actions are disabled given the current belief state. The disabled actions are shown in dashed lines.

Figure 8:
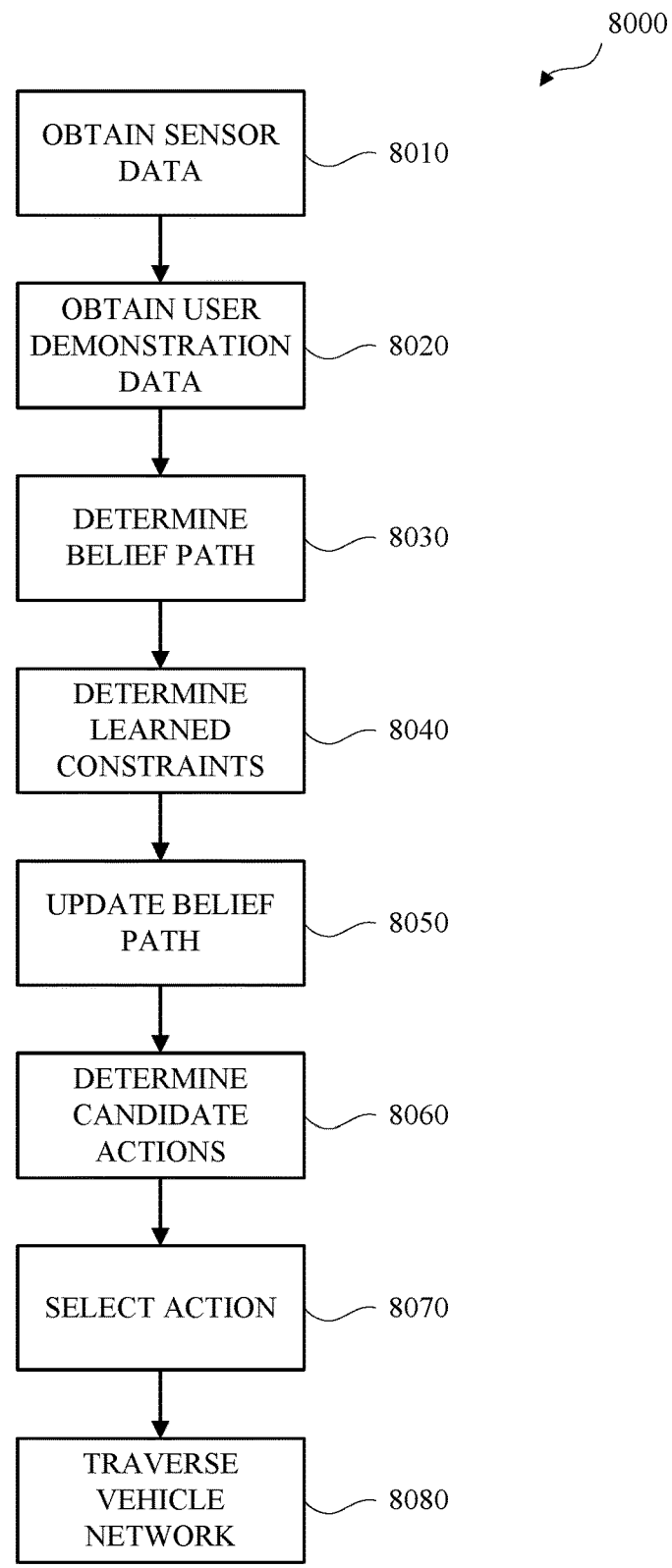
FIG. 8 is a flow diagram of an example of a method for learning constraints based on beliefs.

FIG. 8 is a flow diagram of an example of a method 8000 for learning constraints based on beliefs. At 8010, the method 8000 includes obtaining sensor data. The sensor data may include vehicle operational information, such as perception and localization data obtained from one or more sensors such as a camera, a light detection and ranging (LIDAR) sensor, a radar sensor, or a GPS, whether the vehicle is moving or in a fixed position, a vehicle heading, etc. The sensor data may also include information corresponding to the operational environment of the vehicle, such as information corresponding to one or more external objects, such as pedestrians, remote vehicles, other objects within the vehicle operational environment, vehicle transportation network geometry or topology, or a combination thereof.

At 8020, the method 8000 includes obtaining user demonstration data. The user demonstration data is associated with data that is associated with a sequence of actions and probability distributions of a current state of the vehicle. In some cases, the demonstration data may be intervention data, where the intervention data is a sequence of override actions and probability distributions of a current state of the vehicle.

At 8030, the method 8000 includes determining a belief path. The belief path may be determined based on the sensor data and the user demonstration data. The belief path may be determined using a POMDP model. The POMDP model may be based on a belief simplex. The belief simplex may be a geometric representation of probability distributions of the candidate actions over a finite set of outcomes.

At 8040, the method 8000 includes determining learned constraints. Determining a learned constraint may include determining whether a constraint is true for a belief path and action pair. When the constraint of that belief path and action pair is determined to be true, the action may be disallowed.

At 8050, the method 8000 includes updating the belief path. The belief path may be updated based on the learned constraints. The updated belief path may be a probability distribution over a vehicle state. An example constraint may be that the vehicle not enter the intersection unless the confidence value is at least 99% certain that the vehicle will not collide with another vehicle. Another example constraint may be that the confidence value is at least 90% certain that the vehicle stopped before the stop line. Another example constraint may be that the vehicle should not enter the intersection if the confidence value indicates that a pedestrian is more than 3% likely to cross. Another example constraint may be that the vehicle should not change lanes if the confidence value indicates that it is less than 99% certain that the gap between vehicles will be larger than 1.5 times the size of the vehicle. Another example constraint may be that the vehicle should no enter the intersection before another vehicle that has priority unless the belief that the other vehicles is yielding is greater than 70%. Another example constraint may be that the vehicle should not stop is it is inside the intersection with greater than 50% confidence. Another example constraint may be that the vehicle should not perform an edge action if the vehicle is stopped and believes that a pedestrian is blocking its path with greater than 50% likelihood. Another example constraint may be that the vehicle should keep to the left side of the lane approaching an intersection with just a single entry lane if a following vehicle has its right indicator on with greater than 25% likelihood.

At 8060, the method 8000 includes determining candidate actions. The candidate actions may be determined based on the POMDP model. The candidate actions are constrained by the updated belief path.

At 8070, the method 8000 includes selecting an action. The action is selected from the candidate actions. The selection of the action may be based on a probability threshold. For example, an action that has a confidence value above a threshold can be selected. In an example, the threshold for the confidence value may be 90%. The threshold for the confidence value can vary based on the risk tolerance of the driver.

At 8080, the method 8000 includes traversing a vehicle network using the selected action. The selected action may be a stop action, a go action, or an edge action (e.g., an advance action).

Figure 9:
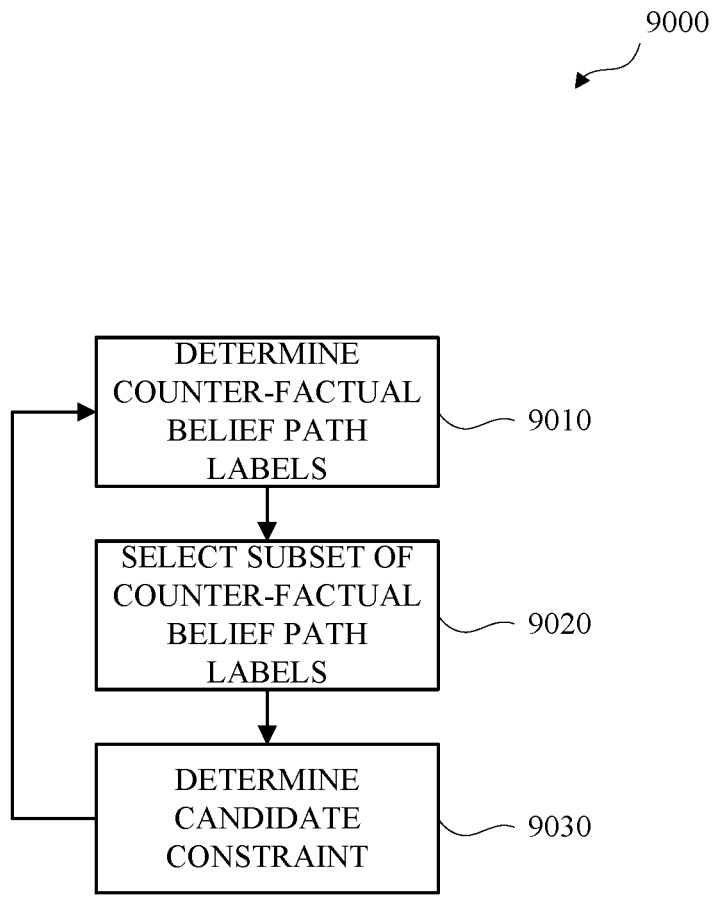
FIG. 9 is a flow diagram of an example of another method for learning constraints based on beliefs.

FIG. 9 is a flow diagram of an example of another method 9000 for learning constraints based on beliefs. At 9010, the method 9000 includes determining one or more counter-factual belief path labels to increase an expectation value of the user demonstration data. For example, the counter-factual belief path labels may be used to determine a constraint that explains when a driver's behavior is unexpected given optimal behavior. At 9020, the method 9000 includes selecting a subset of the determined counter-factual belief path labels. At 9030, the method 9000 includes determining a candidate constraint based on the subset of the determined counter-factual belief path labels.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. In some embodiments, instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the terminology "example", "embodiment", "implementation", "aspect", "feature", or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify", or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or". That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

The above-described aspects, examples, and implementations have been described in order to allow easy understanding of the disclosure are not limiting. On the contrary, the disclosure covers various modifications and equivalent arrangements included within the scope of the appended claims, which scope is to be accorded the broadest interpretation so as to encompass all such modifications and equivalent structure as is permitted under the law.

What is claimed is:

1. A method for use in a vehicle, the method comprising:
obtaining sensor data;
obtaining user demonstration data, wherein the user demonstration data is data associated with a sequence of actions and probability distributions of a current state of the vehicle;
determining a belief path based on the sensor data and the user demonstration data using a partially observable Markov decision process (POMDP) model;
determining learned constraints by sampling a constraint and determining counter-factual belief path labels;
updating the belief path based on the learned constraints;
determining candidate actions based on the POMDP model, wherein the candidate actions are constrained by the updated belief path;
selecting an action of the candidate actions that is above a probability threshold; and
controlling the vehicle using the selected action to traverse a vehicle network.

2. The method of claim 1, wherein determining the learned constraints comprises:
determining the counter-factual belief path labels to increase an expectation value of the user demonstration data;
selecting a subset of the determined counter-factual belief path labels; and
determining a candidate constraint based on the subset of the determined counter-factual belief path labels.

3. The method of claim 1, wherein the POMDP model is based on a belief simplex.

4. The method of claim 3, wherein the belief simplex is a geometric representation of probability distributions of the candidate actions over a finite set of outcomes.

5. The method of claim 1, wherein the updated belief path is a probability distribution over a vehicle state.

6. The method of claim 1, further comprising:
determining whether the constraint is true for a belief path and action pair; and
disallowing the action at the belief path of the belief path and action pair when it is determined that the constraint is true.

7. The method of claim 1, wherein the selected action is a stop action, and edge action, or a go action.

8. A vehicle, comprising:
a sensor configured to obtain sensor data;
a processor configured to:
obtain user demonstration data, wherein the user demonstration data is data associated with a sequence of actions and probability distributions of a current state of the vehicle, wherein the current state of the vehicle is determined based on the sensor data;
determine a belief path based on the sensor data and the user demonstration data using a partially observable Markov decision process (POMDP) model;
sample a constraint and determine counter-factual belief path labels to determine learned constraints;
update the belief path based on the learned constraints;
determine candidate actions based on the POMDP model, wherein the candidate actions are constrained by the updated belief path;
select an action of the candidate actions that is above a probability threshold; and
control the vehicle using the selected action to traverse a vehicle network.

9. The vehicle of claim 8, wherein the processor is further configured to:
determine the counter-factual believe path labels to increase an expectation value of the user demonstration data;
select a subset of determined counter-factual belief path labels; and
determine a candidate constraint based on the subset of the determined counter-factual belief path labels.

10. The vehicle of claim 8, wherein the POMDP model is based on a belief simplex.

11. The vehicle of claim 10, wherein the belief simplex is a geometric representation of probability distributions of the candidate actions over a finite set of outcomes.

12. The vehicle of claim 8, wherein the updated belief path is a probability distribution over a vehicle state.

13. The vehicle of claim 8, wherein the processor is further configured to:
determine whether the constraint is true for a belief path and action pair; and
disallow the action at the belief path of the belief path and action pair when it is determined that the constraint is true.

14. The vehicle of claim 8, wherein the selected action is a stop action, an edge action, or a go action.

15. A non-transitory computer-readable medium comprising instructions, that when executed by a processor, cause the processor to perform operations comprising:
obtaining sensor data;
obtaining user demonstration data, wherein the user demonstration data is associated with a sequence of actions and probability distributions of a current state of a vehicle;
determining a belief path based on the sensor data and the user demonstration data using a partially observable Markov decision process (POMDP) model;
determining learned constraints by sampling a constraint and determining counter-factual belief path labels;
updating the belief path based on the learned constraints;

determining candidate actions based on the POMDP model, wherein the candidate actions are constrained by the updated belief path;

selecting an action of the candidate actions that is above a probability threshold; and controlling the vehicle using the selected action to traverse a vehicle network.

16. The non-transitory computer-readable medium of claim 15, the operations further comprising:

determining the counter-factual belief path labels to increase an expectation value of the user demonstration data;

selecting a subset of the determined counter-factual belief path labels; and determining a candidate constraint based on the subset of the determined counter-factual belief path labels.

17. The non-transitory computer-readable medium of claim 15, wherein the POMDP model is based on a belief simplex.

18. The non-transitory computer-readable medium of claim 17, wherein the belief simplex is a geometric representation of probability distributions of the candidate actions over a finite set of outcomes.

19. The non-transitory computer-readable medium of claim 15, wherein the updated belief path is a probability distribution over a vehicle state.

20. The non-transitory computer-readable medium of claim 15, the operations further comprising:

determining whether the constraint is true for a belief path and action pair; and disallowing the action at the belief path of the belief path and action pair when it is determined that the constraint is true.

* * * * *